(12) United States Patent
Furutani et al.

(10) Patent No.: US 7,768,803 B2
(45) Date of Patent: Aug. 3, 2010

(54) CONTROL DEVICE FOR POWER CONVERTER

(75) Inventors: Shinichi Furutani, Tokyo (JP); Akira Satake, Tokyo (JP); Jun Sawaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 166 days.

(21) Appl. No.: 12/282,887

(22) PCT Filed: Jun. 16, 2006

(86) PCT No.: PCT/JP2006/312157

§ 371 (c)(1),
(2), (4) Date: Sep. 15, 2008

(87) PCT Pub. No.: WO2007/144959

PCT Pub. Date: Dec. 21, 2007

(65) Prior Publication Data

US 2009/0129132 A1    May 21, 2009

(51) Int. Cl.
*H02M 1/12* (2006.01)
*H02M 1/14* (2006.01)
*H02M 7/217* (2006.01)
*H02M 7/5387* (2006.01)

(52) U.S. Cl. .............. 363/40; 363/41; 363/44; 363/127; 363/132

(58) Field of Classification Search ............ 363/39, 363/40, 41, 44, 45, 46, 95, 98, 127, 131, 363/132
See application file for complete search history.

(56) References Cited

U.S. PATENT DOCUMENTS

| 4,729,082 | A | * | 3/1988 | Sato ........................ 363/41 |
| 5,107,438 | A | * | 4/1992 | Sato ........................ 702/107 |
| 5,250,890 | A | * | 10/1993 | Tanamachi et al. ........ 318/811 |
| 5,781,423 | A |   | 7/1998 | Inarida et al. |
| 6,169,677 | B1 | * | 1/2001 | Kitahata et al. ............ 363/71 |

(Continued)

FOREIGN PATENT DOCUMENTS

EP    0 732 798 A1    9/1996

(Continued)

OTHER PUBLICATIONS

Sugimoto, Hidehiko et al., "Theory of AC Servo System and Practice in Designing", published by Sogo Densi Shuppan Inc., Tokyo, Japan, vol. 4, 3 pages (1997).

*Primary Examiner*—Jessica Han
*Assistant Examiner*—Jeffrey Gblende
(74) *Attorney, Agent, or Firm*—Leydig, Voit & Mayer, Ltd.

(57) ABSTRACT

A control circuit for a power converter includes a voltage command unit that generates a voltage command signal, a voltage command compensation unit that compensates the voltage command signal to generate a compensatory voltage command signal, and a switching pattern arithmetic unit that generates a switching signal for each of semiconductor switching elements of the power converter based on the compensatory voltage command signal and a carrier wave. The conversional fundamental frequency of the power converter is f and the carrier frequency of the carrier wave is fc. The voltage command compensation unit generates a compensation signal including at least one compensatory frequency component of fc−n×f (where n denotes successive positive and negative integers), and generates the compensatory voltage command signal.

13 Claims, 13 Drawing Sheets

U.S. PATENT DOCUMENTS 6,437,997 B1 * 8/2002 Inarida et al. .................. 363/37
2002/0141212 A1 * 10/2002 Ishida et al. .................. 363/98

FOREIGN PATENT DOCUMENTS

| JP | 08-251930 A | 9/1996 |
| JP | 09-238472 A | 9/1997 |
| JP | 10-257776 A | 9/1998 |
| JP | 2005-224093 A | 8/2005 |

* cited by examiner

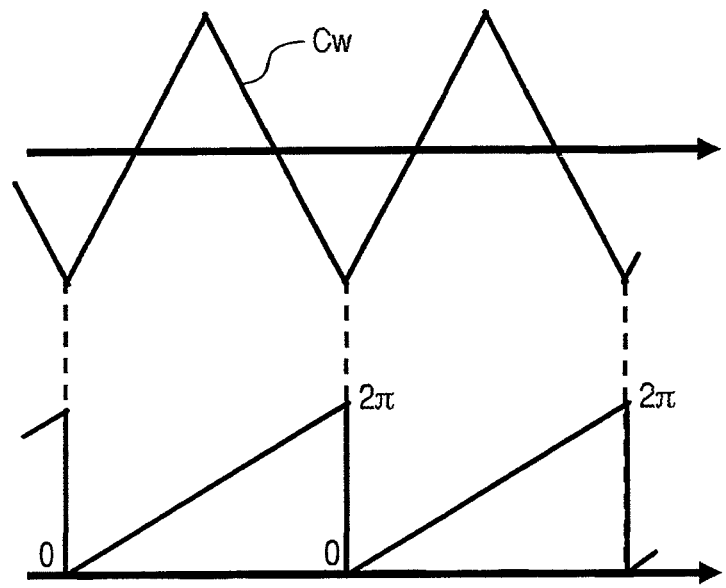
FIG. 3A
FIG. 3B
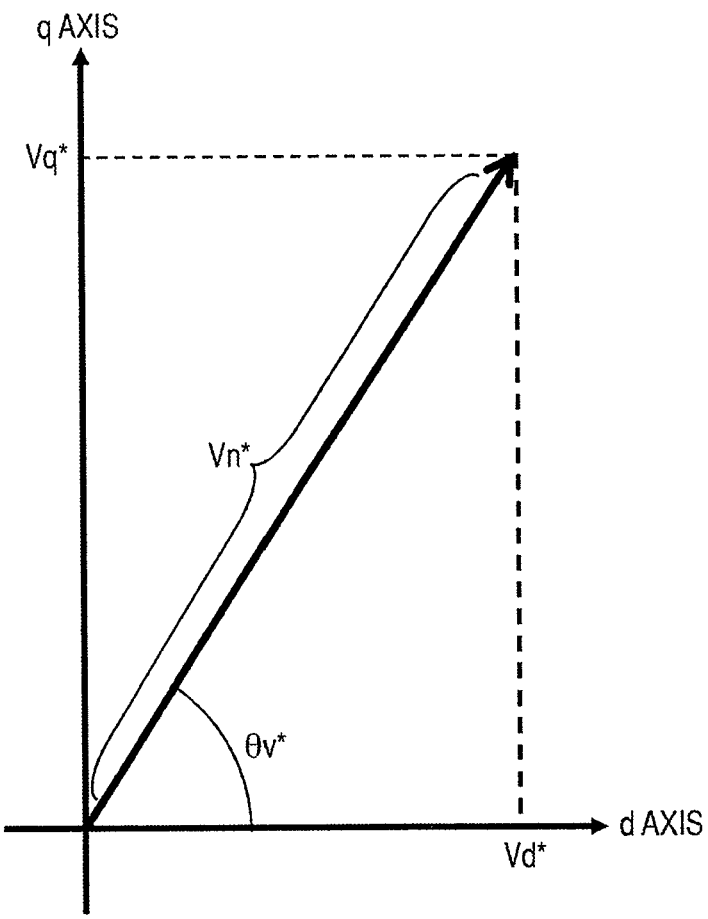
FIG. 4

CONTROL DEVICE FOR POWER CONVERTER

TECHNICAL FIELD

The present invention relates to a control device for a power converter that performs power conversion between direct-current (dc) power and alternating-current (ac) power.

BACKGROUND ART

As this type of power converter, a pulse-width modulation (PWM) inverter that turns on or off multiple semiconductor switching elements by employing pulse-width modulation is known. The PWM inverter has a semiconductor switching element included in each of upper and lower arms of each of phase transformation circuits. The semiconductor switching elements included in the upper and lower arms respectively are complementarily turned on or off with a pulse-width modulated switching signal, whereby an alternating-current (ac) output voltage having the amplitude and frequency thereof controlled is generated. The pulse-width modulated switching signal is produced by comparing a voltage command signal with a carrier wave using a PWM pattern arithmetic unit. As the carrier wave, a triangular wave is often adopted.

For pulse-width modulation, an asynchronous pulse-width modulation method is often employed. In the asynchronous pulse-width modulation method, the frequency fc of a carrier wave is retained at a certain value irrespective of the conversional fundamental frequency f of a PWM inverter, that is, the fundamental wave frequency of the ac output voltage of the PWM inverter. The asynchronous pulse-width modulation method is often adopted by reason that: the number of times of switching of a semiconductor switching element per a unit time can be specified; and the updating timing for a voltage command is synchronous with the peak of the carrier wave, and can be readily controlled using a microcomputer. A microcomputer including an asynchronous pulse-width modulation circuit may be employed.

In the asynchronous pulse-width modulation method, the carrier frequency fc of a carrier wave has to be determined to be a sufficiently high frequency with respect to the fundamental frequency f of the PWM inverter. For example, a page 44 of a literature titled "Theory of AC Servo System and Practice in Designing" (Vol. 4, 1997) published from Sogo Densi Shuppan Inc. reads that fc/f has to be 9 or more. However, depending on a field to which the PWM inverter is applied, a large-capacity semiconductor switching element is adopted as the semiconductor switching element. Therefore, the carrier frequency fc may not be set to a sufficiently high value with respect to the fundamental frequency of the PWM inverter. When fc/f cannot be made sufficiently high, such adverse effects arise that: a vibration called a beat occurs in the ac output voltage of the PWM inverter so as to markedly degrade the precision in the ac output voltage of the PWM inverter; and pulsation occurs in a load current. The beat is a signal having at least one frequency expressed as fc−n×f (where n denotes positive and negative integers), or a combination of signals having the frequencies.

For suppression of the beat, adoption of, for example, a synchronous pulse-width modulation method has been proposed in the past. The synchronous pulse-width modulation method is intended to upgrade the precision in the ac output voltage of the PWM inverter by setting the carrier frequency fc to a frequency that is an integral multiple of the fundamental frequency f of the PWM inverter according to a change in the fundamental frequency f, or by synchronizing the switching operations of the semiconductor switching elements, which are included in the upper and lower arms of each of the phase transformation circuits of the PWM inverter, with the fundamental frequency of the PWM inverter. As long as the synchronous pulse-width modulation method is adopted, since the waveform of the ac output voltage of the PWM inverter is synchronous with a voltage command waveform, the beat can be suppressed. However, in the asynchronous pulse-width modulation method, if the synchronous pulse-width modulation is also adopted, addition of a special device or remodeling is needed. This poses a program in that the cost increases.

In JP9-238472A (patent document 1), a proposal is made of a method in which: the pulse width for a switching pattern relevant to a semiconductor switching element of a PWM inverter is integrated in order to estimate the ac output voltage of the PWM inverter; and a difference of the estimated ac output voltage from a voltage command is added to a voltage command of the next time in order to perform compensation for suppression of a beat. Moreover, in JP2005-224093A (patent document 2), a proposal is made of a method of correcting the frequency of a carrier wave so as to suppress the beat.

Patent document 1: JP9-238472A
Patent document 2: JP2005-224093A

DISCLOSURE OF THE INVENTION

Problem that the Invention is to Solve

However, in the patent document 1, since the ac output voltage of a PWM inverter is estimated by integrating a pulse width, a delay occurs in the estimation. Compensation can be achieved in the voltage command of the next time. Moreover, since the compensation is a kind of feedback control, when the frequency of a beat is high, it is hard to suppress the beat. Moreover, in the patent document 2, for correcting the frequency of a carrier wave, a special carrier wave correction circuit has to be added.

The invention proposes a control device for a power converter that has been improved to be able to suppress a beat more readily and more highly precisely than the prior arts.

Means for Solving the Problem

A control device for a power converter in accordance with the invention is a control device for a power converter which controls the power converter that performs power conversion between dc power and ac power by means of multiple semiconductor switching elements, and includes: a voltage command means that generates a voltage command signal; a voltage command compensation means that performs compensation on the voltage command signal and generates a compensatory voltage command signal; and a switching pattern arithmetic means that generates a switching signal for each of the semiconductor switching elements on the basis of the compensatory voltage command signal and a carrier wave. The control device for the power converter is characterized in that: assuming that the conversional fundamental frequency of the power converter is f and the carrier frequency of the carrier wave is fc, the voltage command compensation means generates a compensation signal including at least one compensatory frequency component selected from a group expressed by fc−n×f (where n denotes successive positive and negative integers); and the compensatory voltage command signal is generated based on the compensation signal.

ADVANTAGE OF THE INVENTION

A control device for a power converter in accordance with the invention has a voltage command compensation means added to a voltage command means in a control circuit that controls semiconductor switching elements of a power converter, provides a compensatory voltage command signal that is a voltage command signal compensated based on a compensation signal including at least one compensation frequency component selected from a group expressed by fc−n×f (where n denotes successive positive and negative integers), and can suppress a beat readily and highly precisely owing to feed-forward control.

BRIEF DESCRIPTION OF THE DRAWINGS

FIG. 3A is a waveform diagram showing a carrier wave employed in the embodiment 1 and FIG. 3B is a diagram showing a phase change in the carrier wave;

FIG. 4 is a vector diagram showing a voltage command employed in the embodiment 1;

BEST MODE FOR CARRYING OUT THE INVENTION

Figure 1:
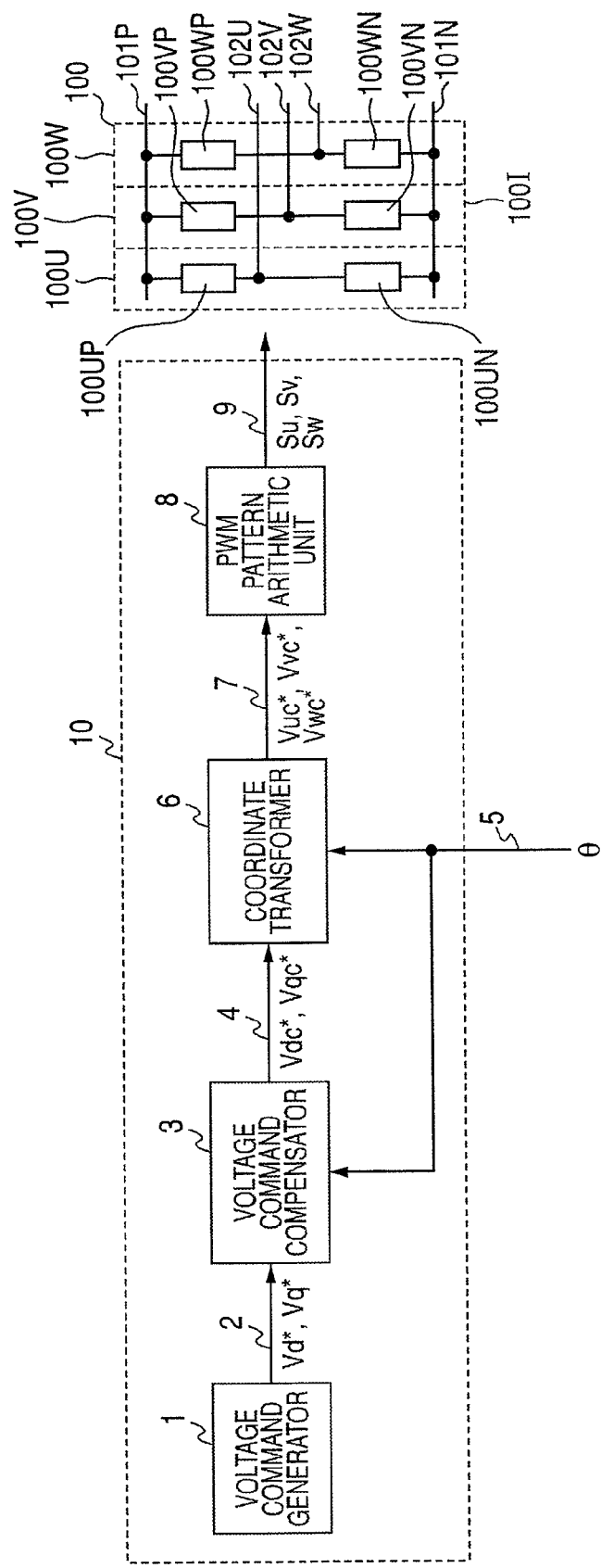
FIG. 1 is a block diagram showing an embodiment 1 of a control device for a power converter in accordance with the invention.

Referring to the drawings, some embodiments of the invention will be described below.

Embodiment 1

FIG. 1 is a block diagram showing an embodiment 1 of a control device for a power converter in accordance with the invention. The control device for the power converter of the embodiment 1 includes a power converter 100 and a control circuit 10. The power converter 100 is, in the embodiment 1, a pulse-width modulation (PWM) inverter 100I. The control circuit 10 constitutes a control device for the power converter 100. The control circuit 10 includes a voltage command generator 1 that is a voltage command means, a voltage command compensator 3 that is a voltage command compensation means, a coordinate transformer 6, and a PWM pattern arithmetic unit 8 that is a switching pattern arithmetic means. The voltage command generator 1, voltage command compensator 3, and coordinate transformer 6 are pieces of means to be executed by, for example, a microcomputer.

The PWM inverter 100I is, for example, a three-phase PWM inverter, and includes a U phase transformation circuit 100U, a V phase transformation circuit 100V, and a W phase transformation circuit 100W. The phase transformation circuits 100U, 100V, and 100W are connected in parallel with one another between a pair of direct-current (dc) lines 101P and 101N. The U phase transformation circuit 100U includes an upper arm 100UP and a lower arm 100UN, the V phase transformation circuit 100V includes an upper arm 100VP and a lower arm 100VN, and the W phase transformation circuit 100W includes an upper arm 100WP and a lower arm 100WN. A U phase alternating current (ac) line 102U is connected between the upper arm 100UP and lower arm 100UN of the U phase transformation circuit 100U. A V phase ac line 102V is connected between the upper arm 100VP and lower arm 100VN of the V phase transformation circuit 100V. A W phase ac line 102W is connected between the upper arm 100WP and lower arm 100WN of the W phase transformation circuit 100W.

The upper arms 100UP, 100VP, and 100WP and the lower arms 100UN, 100VN, and 100WN are formed with power semiconductor switching elements. A switching signal 9 outputted from the PWM pattern arithmetic unit 8 includes switching signals Su, Sv, and Sw. The switching signal Su complementarily turns on or off the semiconductor switching elements forming the upper and lower arms 100UP and 100UN respectively of the U phase transformation circuit 100U, the switching signal Sv complementarily turns on or off the semiconductor switching elements forming the upper and lower arms 100VP and 100VN respectively of the V phase transformation circuit 100V, and the switching signal Sw complementarily turns on or off the semiconductor switching elements forming the upper and lower arms 100WP and 100WN respectively of the W phase transformation circuit 100W. When the semiconductor switching elements forming the upper and lower arms of the phase transformation circuits 100U, 100V, and 100W are complementarily turned on or off, the PWM inverter 100I transforms a dc voltage between the dc lines 101P and 101N into an ac voltage, and develops an ac output voltage on the ac line 102U, 102V, or 102W. In the PWM inverter 100I, the conversional voltage is the ac output voltage developed on the ac line 102U, 102V, or 102W, and the ac output voltage has a fundamental frequency f.

In the control circuit 10, a d-q axis frame is adopted as an orthogonal biaxial rotating frame for use in handling a signal such as a voltage command signal. The voltage command generator 1 outputs a voltage command signal 2 on the d-q axis frame. The voltage command signal 2 includes Vd* and Vq*. Vd* denotes a voltage command signal on a d axis, and Vq* denotes a voltage command signal on a q axis. A coordinate transformation signal 5 is fed to each of the voltage command compensator 3 and coordinate transformer 6. The coordinate transformation signal 5 is a coordinate transformation phase signal θ. The voltage command compensator 3 receives the voltage command signal 2, and generates a compensatory voltage command signal 4 that is the voltage command signal 2 having been compensated. The compensatory voltage command signal 4 is also a signal on the d and q axes and includes Vdc* and Vqc*. Vdc* denotes a compensatory voltage command signal on the d axis, and Vqc* denotes a compensatory voltage command signal on the q axis. The coordinate transformer 6 receives the compensatory voltage command signal 4 on the d and q axes, and transforms the compensatory voltage command signal 4 into a voltage command signal 7 on a rest frame.

The voltage command signal 7 on the rest frame includes Vuc*, Vvc*, and Vwc*. Vuc* denotes a voltage command signal for the U phase transformation circuit 100U, Vvc* denotes a voltage command signal for the V phase transformation circuit 100V, and Vwc* denotes a voltage command signal for the W phase transformation circuit 100W. The PWM pattern arithmetic unit 8 receives the voltage command signal 7 on the rest frame, compares the voltage command signal 7 with a carrier wave Cw, and generates switching signals Su, Sv, and Sw. The carrier wave Cw is shown in FIGS. 3A, 3B. FIG. 3A shows the waveform of the carrier wave Cw, and FIG. 3B shows a phase change in the carrier wave Cw. The axes of abscissas of FIG. 3A and FIG. 3B are common time axes. The carrier wave Cw is, as apparent from FIG. 3A, for example, a triangular wave, and the phase thereof cyclically changes, as apparent from FIG. 3B, from 0 to $2\pi$. The carrier frequency of the carrier wave Cw shall be fc.

Figure 2:
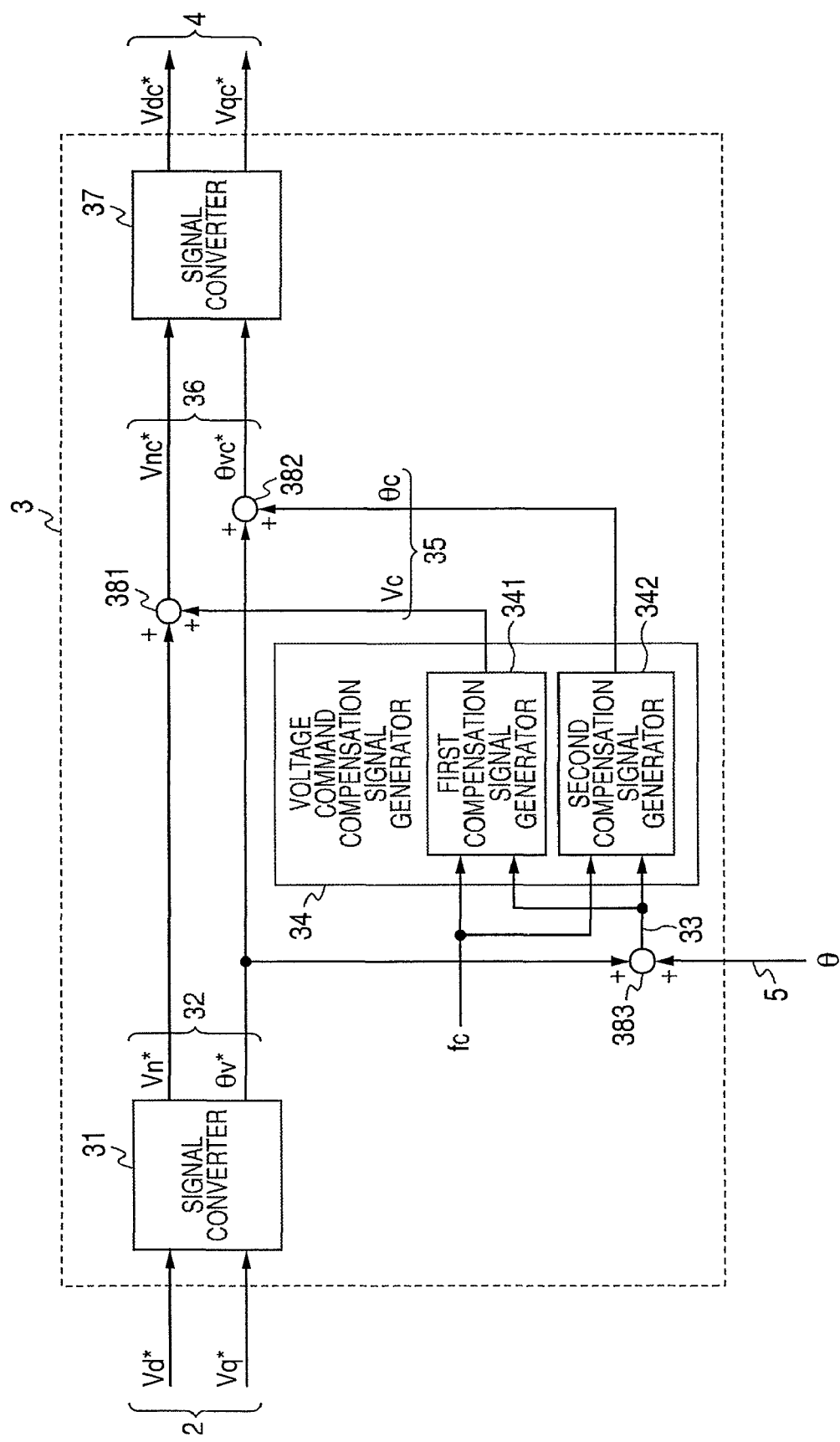
FIG. 2 is a block diagram showing the detail of a voltage command compensator employed in the embodiment 1.

FIG. 2 is a block diagram showing the detail of the voltage command compensator 3 in FIG. 1. The voltage command compensator 3 is a means to be executed by, for example, a microcomputer. The voltage command compensator 3 includes, as shown in FIG. 2, a signal converter 31, a voltage command compensation signal generator 34, a signal converter 37, and adders 381, 382, and 383. The signal converter 31 receives the voltage command signal 2, which includes the voltage command signal Vd* on the d axis and the voltage command signal Vq* on the q axis, converts the voltage command signal 2 into a voltage command signal 32 of a vectorial representation, and outputs the voltage command signal 32. The voltage command signal 32 includes an amplitude command signal Vn* of a vectorial representation and a phase command signal θv* of a vectorial representation. The amplitude command signal Vn* is fed to the adder 381, and the phase command signal θv* is fed to the adder 382.

The amplitude command signal Vn* and phase command signal θv* of vectorial representations are shown in FIG. 4. In FIG. 4, the axis of abscissas is the d axis and the axis of ordinates is the q axis. The amplitude command signal Vn* is, as apparent from FIG. 4, a synthetic vector of the voltage command signal Vd* on the d axis and the voltage command signal Vq* on the q axis, and the phase command signal θv* represents an angle between the amplitude command signal Vn* and the d axis.

The phase command signal θv* is also fed to the adder 383. The coordinate transformation phase signal θ is also fed to the adder 383. The adder 383 adds up the phase command signal θv* and coordinate transformation phase signal θ, generates a voltage command phase signal 33 on the rest frame, and feeds the voltage command phase signal 33 to the voltage command compensation signal generator 34. The voltage command phase signal 33 is equal to (θv*+θ). The carrier frequency fc is fed together with the voltage command phase signal 33 to the voltage command compensation signal generator 34. The voltage command compensation signal generator 34 outputs the voltage command compensation signal 35 on the basis of the voltage command phase signal 33 and carrier frequency fc. The voltage command compensation signal 35 includes a compensation signal Vc of an amplitude component and a compensation signal θc of a phase component. The voltage command compensation signal 35 is a compensation signal for suppressing a beat contained in an ac output voltage of the PWM inverter 100I.

The voltage command compensation signal generator 34 includes a first compensation signal generator 341 and a second compensation signal generator 342. The first compensation signal generator 341 receives the voltage command phase signal 33 and carrier frequency fc, and generates the compensation signal Vc of an amplitude component on the basis of the voltage command phase signal 33 and carrier frequency fc. The second compensation signal generator 342 receives the voltage command phase signal 33 and carrier frequency fc, and generates the compensation signal θc of a phase component on the basis of the voltage command phase signal 33 and carrier frequency fc. The first compensation signal generator 341 feeds the compensation signal Vc of the amplitude component to the adder 381. The compensation signal Vc of an amplitude component is added to the amplitude command signal Vn* by the adder 381. The second compensation signal generator 342 feeds the compensation signal θc of a phase component to the adder 382. The compensation signal θc of a phase component is added to the phase component signal θv* by the adder 382. The compensatory voltage command signal 36 of a vectorial representation is outputted from the adders 381 and 382.

The compensatory voltage command signal 36 of a vectorial representation includes a compensatory amplitude command signal Vnc* of a vectorial representation and a compensatory phase command signal θvc* of a vectorial representation. The compensatory amplitude command signal Vnc* is outputted from the adder 381. The compensatory amplitude command signal Vnc* is Vnc*=Vn*+Vc. The compensatory phase command signal θvc* is outputted from the adder 382. The compensatory phase command signal θvc* is θvc*=θv*+θc. The signal converter 37 converts the compensatory voltage command signal 36 of a vectorial representation into a compensatory voltage command signal 4 on the d and q axes. The compensatory voltage command signal 4 on the d and q axes includes a compensatory voltage command signal Vdc* on the d axis and a compensatory voltage command signal Vqc* on the q axis.

The compensation signal Vc of an amplitude component generated by the first compensation signal generator 341 and the compensation signal θc of a phase component generated by the second compensation signal generator 342 are compensation signals for use in suppressing a beat contained in an ac output voltage of the PWM inverter 100I. Based on the compensation signal Vc and compensation signal θc, the voltage command compensator 3 converts the voltage command signal 2 into the compensatory voltage command signal 4 through feed-forward control. By employing the voltage command compensator 3, the beat can be readily suppressed. The beat contained in the ac output voltage of the PWM inverter 100I is a signal having at least one frequency selected from a group of frequencies expressed by fc−n×f (where n denotes successive positive and negative integers), or a combination of multiple signals having multiple frequencies selected from the frequency group. The compensation signal Vc of an amplitude component and the compensation signal θc of a phase component include a compensatory frequency component having the same frequency as the beat does.

The compensatory frequency component shall be fco. The compensatory frequency component fco includes a component of at least one compensatory frequency selected from a compensatory frequency group expressed by an equation (1) below, or components of multiple compensatory frequencies selected from the compensatory frequency group. In other words, the compensation signals Vc and θc each include one signal or multiple signals, and the signals each include a compensatory frequency component selected from compensatory frequency components fco(n).

$$fco(n)=fc-n\times f \qquad (1)$$

where n denotes successive positive and negative integers.

Figure 5:
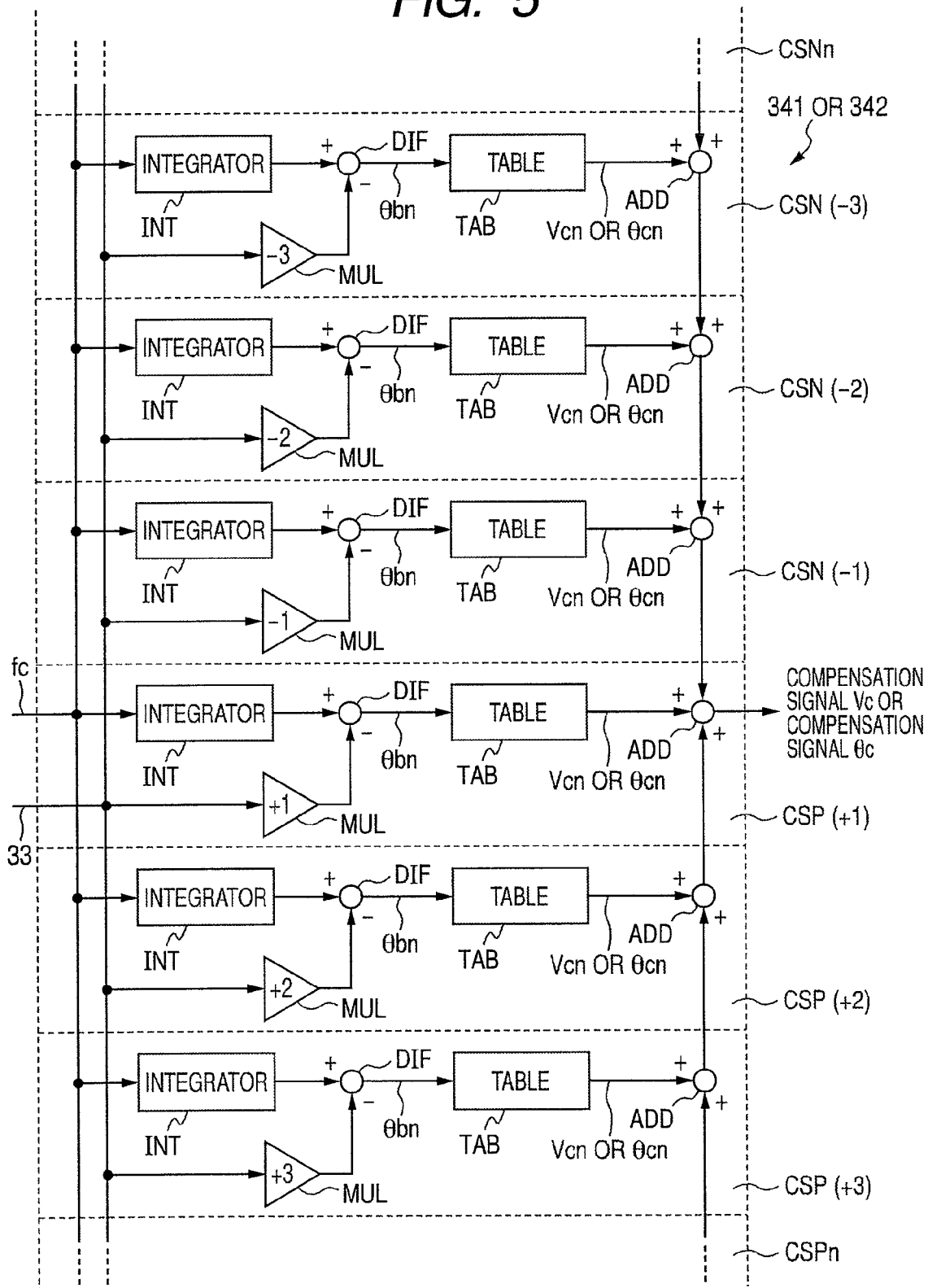
FIG. 5 is a block diagram showing the detail of a voltage command compensation signal generator employed in the embodiment 1.

FIG. 5 shows the detail of the first compensation signal generator 341 and second compensation signal generator 342 included in the voltage command compensation signal generator 34 shown in FIG. 2. The first and second compensation signal generators 341 and 342 have the same configuration. FIG. 5 shows the internal configuration shared by the first and second compensation signal generators 341 and 342. A compensation signal to be outputted is shown as Vc or θc. Noted is that it is the first compensation signal generator 341 which outputs the compensation signal Vc, and that it is the second compensation signal generator 342 which outputs the compensation signal θc.

The first and second compensation signal generators 341 and 342 each include, as shown in FIG. 5, n positive compensation signal generation stages CSPn, and n negative compensation signal generation stages CSNn. In the positive compensation signal generation stages CSPn, n corresponds to any of the successive positive integers in the equation (1), that is, (+1), (+2), (+3), etc. Specifically, the positive compensation signal generation stages CSPn include compensation signal generation stages CSP(+1), CSP(+2), CSP(+3), etc. In the negative compensation signal generation stages CSNn, n corresponds to any of the successive negative integers in the equation (1), that is, (−1), (−2), (−3), etc. Specifically, the negative compensation signal generation stages CSNn include compensation signal generation stages CSN(−1), CSN(−2), CSN(−3), etc.

The compensation signal generation stages CSPn and CSNn each include a multiplier MUL that receives the voltage command phase signal 33, an integrator INT that receives the carrier frequency fc, a compensation table TAB, a subtractor DIF, and an adder ADD. The multiplier MUL multiplies the voltage command phase signal 33 by n. The integrator INT integrates the carrier frequency fc to obtain a phase component of the carrier wave Cw, and outputs the phase component as an integral output. The subtractor DIF subtracts the multiplicative output of the multiplier MUL from the integral output of the integrator INT, and feeds a phase base signal θbn to the compensation table TAB. The phase base signal θbn is associated with n in the equation (1), and computed independently by each of the compensation signal generation stages CSPn and CSNn. The compensation table TAB stores multiple compensation values of the compensation signal Vc or θc associated with the phase base signal θbn, selects a compensation value associated with the phase base signal θbn on the basis of the phase base signal θbn, and outputs the compensation value as a stage compensation signal Vcn or θcn. The adder ADD adds the stage compensation signal Vcn or θcn to the stage compensation signal Vcn or θcn of any other compensation signal generation stage CSPn or CSNn.

The multiplier MUL of each of the compensation signal generation stages CSPn and CSNn has a multiplicative constant n corresponding to n in the equation (1). The multiplicative constants of the multipliers MUL of the positive compensation signal generation stages CSP(+1), CSP(+2), CSP(+3), etc. respectively are (+1), (+2), (+3), etc. The multiplicative constants of the multipliers MUL of the negative compensation signal generation stages CSN(−1), CSN(−2), CSN(−3), etc. respectively are (−1), (−2), (−3), etc. The adder ADD in the compensation signal generation stage CSP(+1) adds up the stage compensation signals Vcn or θcn of all the compensation signal generation stages CSPn or CSNn so as to generate the compensation signal vc or θc.

In each of the compensation tables TAB in the respective compensation signal generation stages CSPn and CSNn, multiple compensation values associated with the phase base signal θbn are stored. The compensation values are obtained in advance experimentally or through simulation, and stored in each of the compensation tables TAB in the respective compensation signal generation stages CSPn and CSNn. Thereafter, the compensation values are adjusted experimentally or through simulation. The compensation values may be multidimensional compensation values capable of being modified according to an operating condition for the PWM inverter 100I. As the operating condition for the PWM inverter 100I, the carrier frequency fc, the fundamental frequency f, the amplitude command signal Vn* of the voltage command signal 32, or the dc voltage value between the dc lines 101P and 101N of the PWM inverter 100I is adopted.

In the first and second compensation signal generators 341 and 342 shown in FIG. 5, n compensation signal generation stages are formed as each of the positive compensation signal generation stages CSPn and negative compensation signal generation stages CSNn. An arbitrary number of compensation signal generation stages may be formed according to the operating condition for the PWM inverter 100I and the applied field thereof. The first and second compensation signal generators 341 and 342 each constitute at least one compensation signal generation stage selected from among the 2n compensation signal generation stages shown in FIG. 5. Moreover, in each of the compensation signal generation stages CSPn and CSNn shown in FIG. 5, the integrator INT is used to integrate the carrier frequency fc so as to obtain the phase of the carrier wave Cw. Alternatively, the phase of the carrier wave Cw may be obtained directly from the size and state of the carrier wave Wc shown in FIG. 3A and FIG. 3B.

Moreover, the first and second compensation signal generators 341 and 342 shown in FIG. 5 each use the compensation tables TAB to obtain the stage compensation signals Vcn or θcn of the compensation signal generation stages. Alternatively, the stage compensation signals Vcn or θcn may be obtained arithmetically according to equations (2) and (3) below.

$$Vcn=Rvn\times\cos(\theta bn+Fvn)+Avn \qquad (2)$$

$$\theta cn=Rthn\times\cos(\theta bn+Fthn)+Athn \qquad (3)$$

where the subscript n of Vcn or θcn corresponds to n in the frequency (fc−n×f) of a beat, that is, any of successive positive and negative integers. Moreover, θbn denotes a phase base signal outputted from the subtractor DIF of each of the compensation signal generation stages CSPn and CSNn. The subscript n of θbn also corresponds to n in the beat frequency (fc−n×f), that is, any of the successive positive and negative integers. Moreover, Rvn, Fvn, Avn, Rthn, Fthn, and Athn denote parameters employed in computation. The subscripts n of the parameters correspond to n in the beat frequency (fc−n×f), that is, any of the successive positive and negative integers. Rvn and Rthn are amplitude parameters, Fvn and Fthn are phase parameters, and Avn and Athn are mean value parameters. The parameters are determined in association with each of the compensatory frequencies fco of the compensatory frequency group fco(n) in the equation (1).

Figure 6:
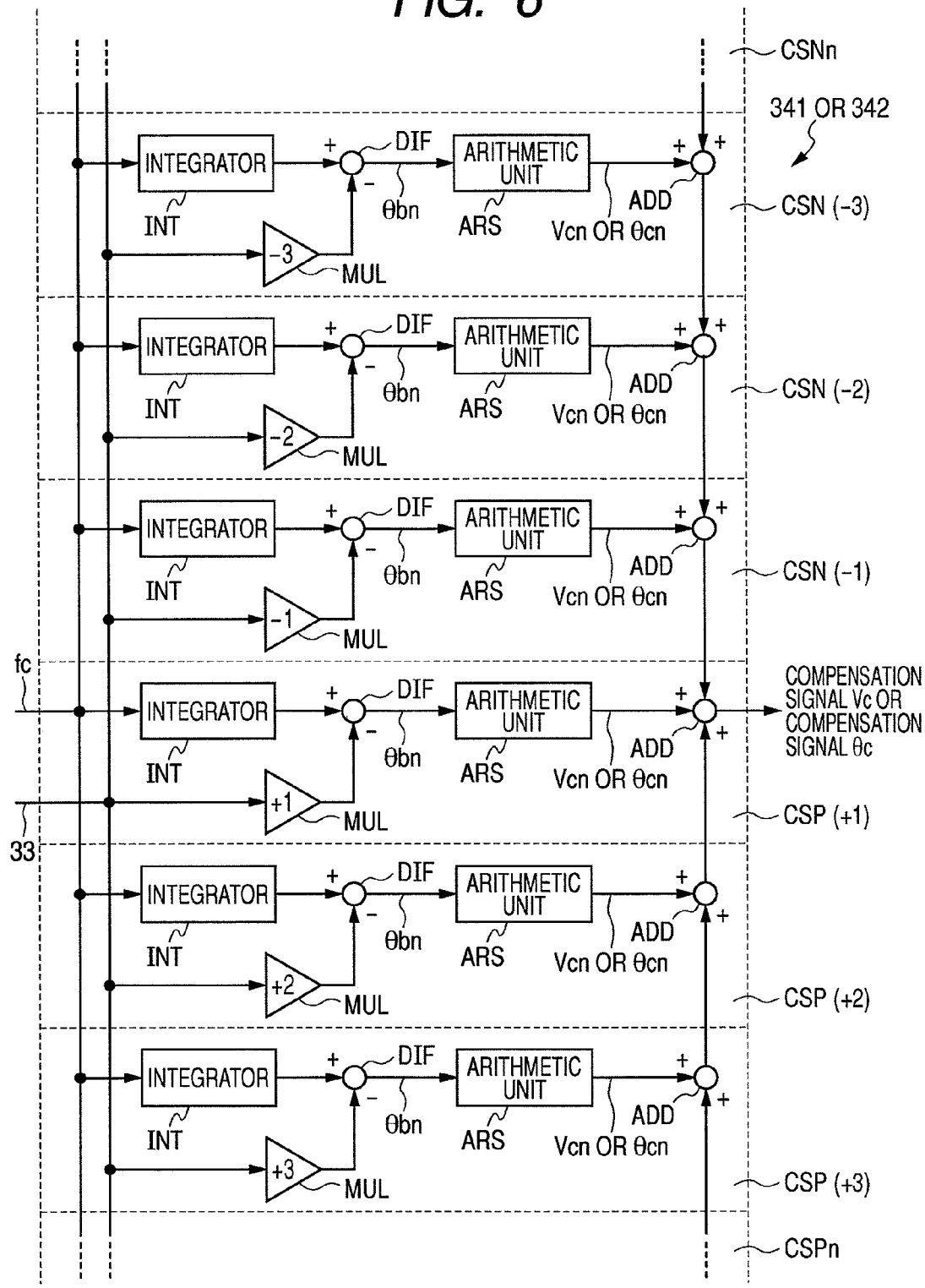
FIG. 6 is a block diagram showing the detail of a variant of the voltage command compensation signal generator employed in the embodiment 1.

FIG. 6 shows the configuration of the first and second compensation signal generators 341 and 342 in a case where the equation (2) or (3) is used to compute and output the stage compensation signals Vcn or θcn. Even in this case, the first and second compensation signal generators 341 and 342 have the same configuration. FIG. 6 shows the internal configuration shared by the first and second compensation signal generators 341 and 342. The compensation signals to be outputted are shown as Vc or θc. It is the first compensation signal generator 341 which outputs the compensation signals vc, and it is the second compensation signal generator 342 which outputs the compensation signals θc.

In FIG. 6, the compensation tables TAB in the compensation signal generation stages CSPn and CSNn shown in FIG. 5 are replaced with arithmetic units ARS. The other components are identical to those shown in FIG. 5. The arithmetic units ARS in the compensation signal generation stages CSPn and CSNn each compute the stage compensation signal Vcn or θcn using the equation (2) or (3). In each of the compensation signal generation stages CSPn and CSNn, the arithmetic unit ARS references the parameters Rvn, Fvn, and Avn for the equation (2) or the parameters Rthn, Fthn, and Athn for the equation (3) so as to compute the stage compensation signal Vcn or θcn. In each of the arithmetic units ARS, the parameters are stored in a parameter table. Compared with the form of a table listing signal waveforms, the storage capacity of the parameter table can be made small. Moreover, the parameters for the equation (2) or (3) may be multidimensional parameters whose values can be varied depending on the operating condition for the PWM inverter 100I.

Figure 7A:
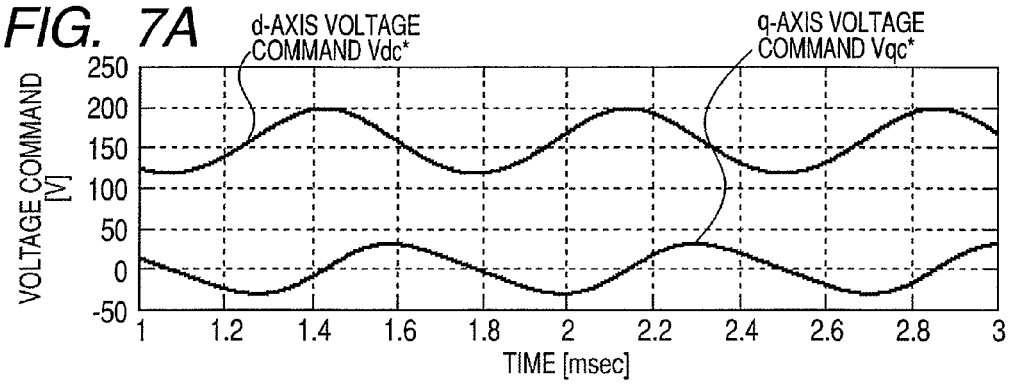
FIGS. 7A-7D are waveform diagrams showing various waveforms concerning the control device for the power converter in accordance with the embodiment 1.
Figure 7B:
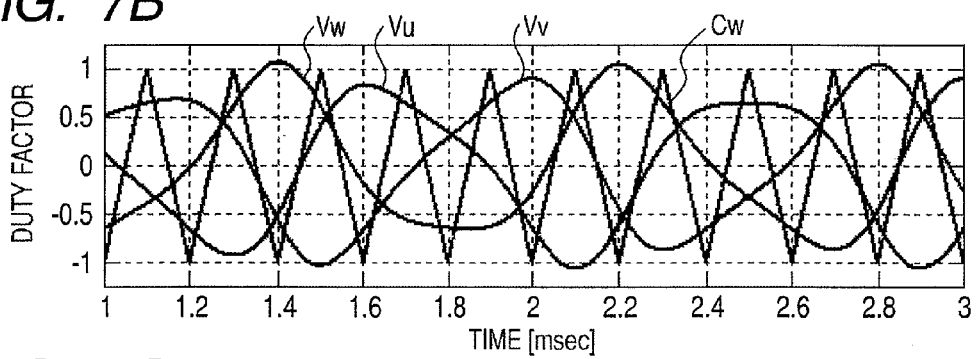
Figure 7C:
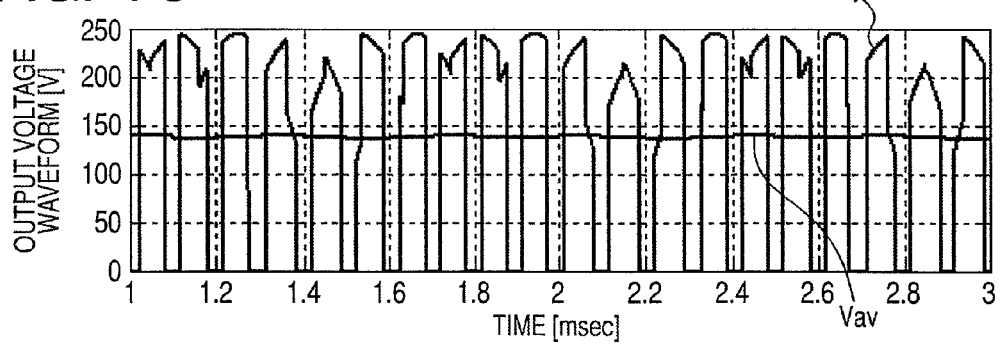
Figure 7D:
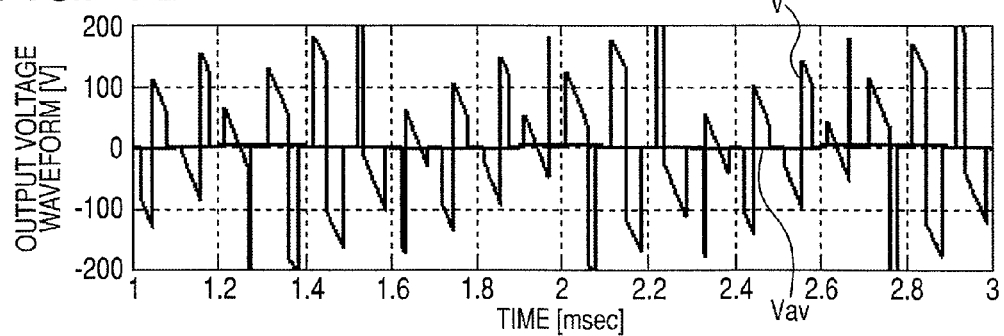
Figure 8A:
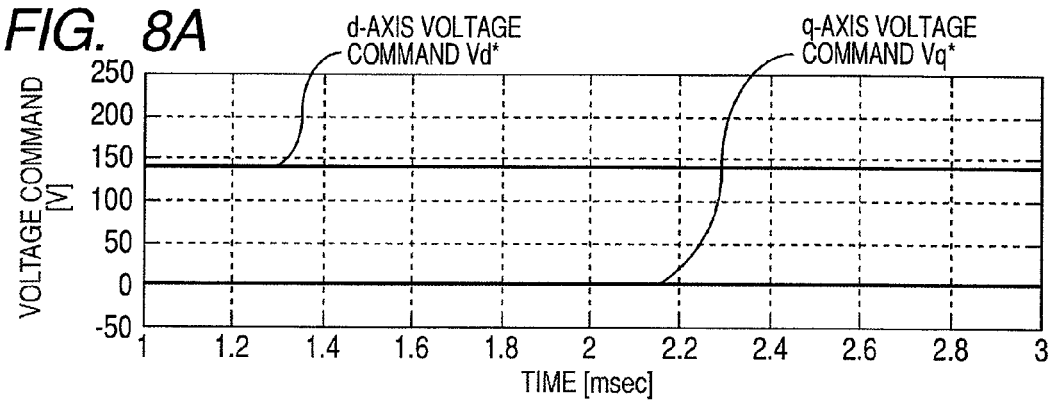
FIGS. 8A-8D are waveform diagrams showing, for comparison with FIGS. 7A-7D, various waveforms concerning a control device having the voltage command compensator in the embodiment 1 excluded therefrom.
Figure 8B:
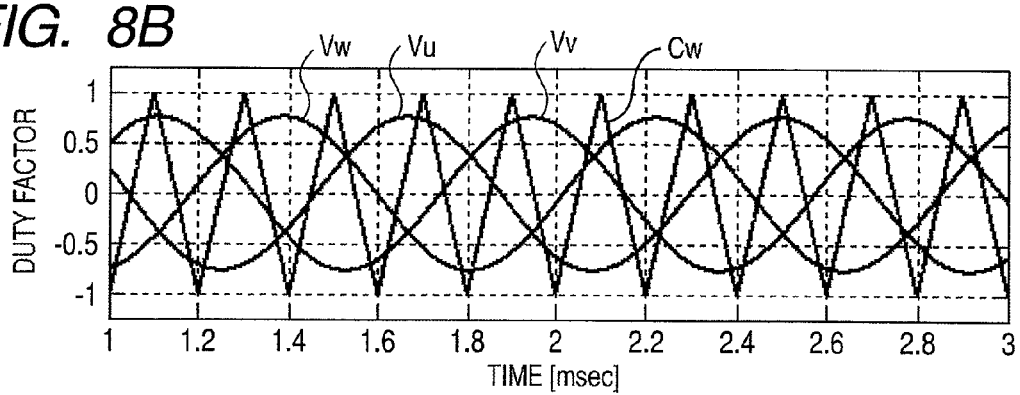
Figure 8C:
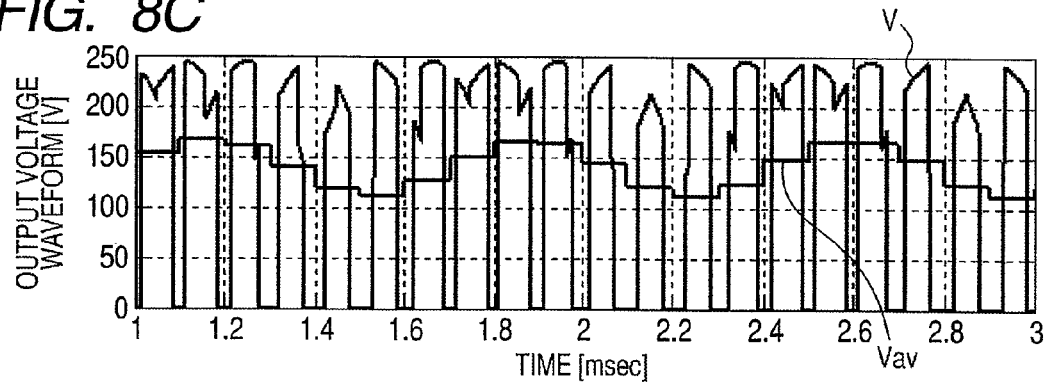
Figure 8D:
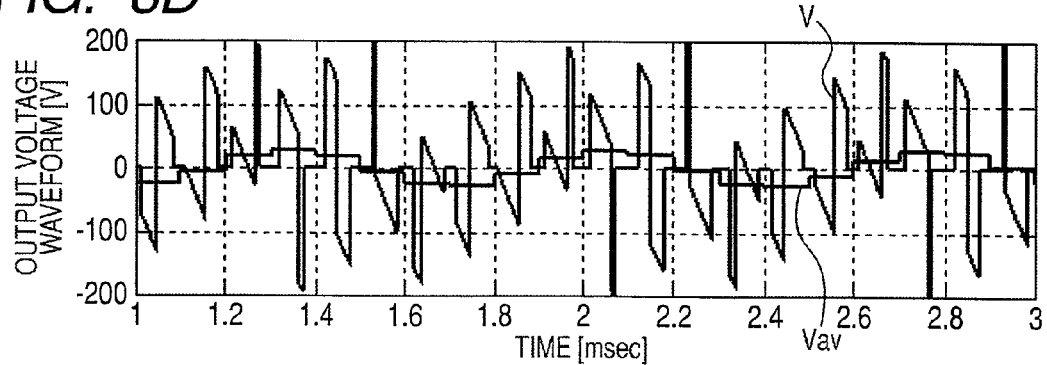

For the control device for a power converter in accordance with the embodiment 1, the advantage of improvement in precision of an ac output voltage of the PWM inverter 100I will be described with reference to FIGS. 7A-7D and FIGS. 8A-8D. FIGS. 7A-7D show various waveforms relevant to the control device for a power converter in accordance with the embodiment 1, and FIGS. 8A-8D show, for comparison with the waveforms, various waveforms relevant to the control circuit 10 having the voltage command compensator 3 in the embodiment 1 excluded therefrom. FIG. 7A shows the voltage command signal Vdc* on the d axis of the compensatory voltage command signal 4 outputted from the voltage command compensator 3, and the voltage command signal Vqc* on the q axis thereof. In FIGS. 8A-8D, the voltage command compensator 3 is not used, and the voltage command signal 2 comes to the voltage command signal 4 as it is. FIG. 8A shows the voltage command signal Vd* on the d axis of the voltage command signal 2, and the voltage command signal Vq* on the q axis thereof. FIG. 7B shows the conversion rates of the ac output voltages Vu, Vv, and Vw of the U, V, and W phases on the rest frame, which are computed based on the compensatory voltage command signal 4 on the d and q axes, and the carrier wave Cw. FIG. 8B shows the conversion rates of the ac output voltages Vu, Vv, and Vw, which are computed based on the voltage command signal 2 on the d and q axes, and the carrier wave Cw. FIG. 7C and FIG. 8C show waveforms of the ac output voltage V of the PWM inverter 100 observed on the d axis. FIG. 7D and FIG. 8D show the waveforms of the ac output voltage V of the PWM inverter 100I observed on the d axis. In FIGS. 7C, 7D and FIGS. 8C, 8D, the ac output voltage waveform V of the PWM inverter 100I is shown together with an average waveform Vav produced by averaging peak-to-peak portions of the carrier wave Cw.

FIGS. 7A-7D and FIGS. 8A-8D show waveforms on the assumption that the carrier frequency fc is set to 5 kHz, the fundamental frequency of the ac output voltage of the PWM inverter 100I is set to 1.2 kHz, the voltage command signal Vd* on the d axis is set to 140 V, the voltage command signal Vq* on the q axis is set to 0, and the dc voltage between the dc lines 101P and 101N of the power converter 100 is set to 300 V. In this case, fc/f is approximately 4.2, and the carrier frequency fc cannot be said to be sufficiently high compared with the fundamental frequency f. The axes of abscissas of FIGS. 7A-7D and FIGS. 8A-8D are common time axes.

In FIGS. 8A-8D, since the voltage command compensator is not used, marked appearance of a beat of 1.4 kHz equivalent to n=3 is verified from FIG. 8C and FIG. 8D. In contrast, in FIGS. 7A-7D, the voltage command compensator 3 is used. The voltage command signal Vd* on the d axis of the voltage command signal 2 and the voltage command signal Vq* on the q axis thereof which are shown in FIG. 8A are compensated to be the compensatory voltage command signal Vdc* on the d axis of the compensatory voltage command signal 4 and the voltage command signal Vqc* on the q axis thereof which are shown in FIG. 7A. As a result, the beat is suppressed as shown as the average waveform Vav of FIG. 7C and FIG. 7D.

Incidentally, the waveforms in FIGS. 7A-7D are waveforms obtained when the first and second compensation signal generators 341 and 342 of the voltage command compensation signal generator 34 are constructed using the arithmetic units ARS shown in FIG. 6. Since the operating condition brings about marked appearance of a beat equivalent to n=3, the first and second compensation signal generators 431 and 342 are each constructed using only the positive compensation signal generation stage CSP(+3) equivalent to n=3. In the computation of the equation (2), the parameters are set to Rn(+3)=40, Fn(+3)=0.02, and Av(+3)=18. The parameters in the equation (3) are set to Rth(+3)=0.19, Fth(+3)=4.7, and Ath(+3)=0.04.

FIGS. 7A-7D show waveforms associated with one operating condition for the PWM inverter 100I. Under any other operating condition, once the parameters in the equations (2) and (3) are adjusted, the beat can be satisfactorily suppressed.

As mentioned above, according to the embodiment 1, even when a sufficiently high carrier frequency fc cannot be ensured, while an asynchronous pulse-width modulation method is adopted, a beat can be satisfactorily suppressed.

In the embodiment 1, a description is made of a case where the compensation signals Vc and θc are added to the voltage command signals Vd* and Vq* on the d and q axes. Alternatively, the compensation signals Vc and θc may be added to the voltage command signal 7 on the rest frame. In this case, although the frequencies of the compensation signals Vc and θc have to be manipulated for the addition, the compensating operation for the voltage command signal is identical to that in the embodiment 1. As for to which of the voltage command signals Vd* and Vq* on the d and q axes and the voltage command signal 7 on the rest frame the compensation signals Vc and θc are added, either the voltage command signals Vd* and Vq* on the d and q axes or the voltage command signal 7 on the rest frame that will be convenient for mounting can be selected.

Embodiment 2

Figure 9:
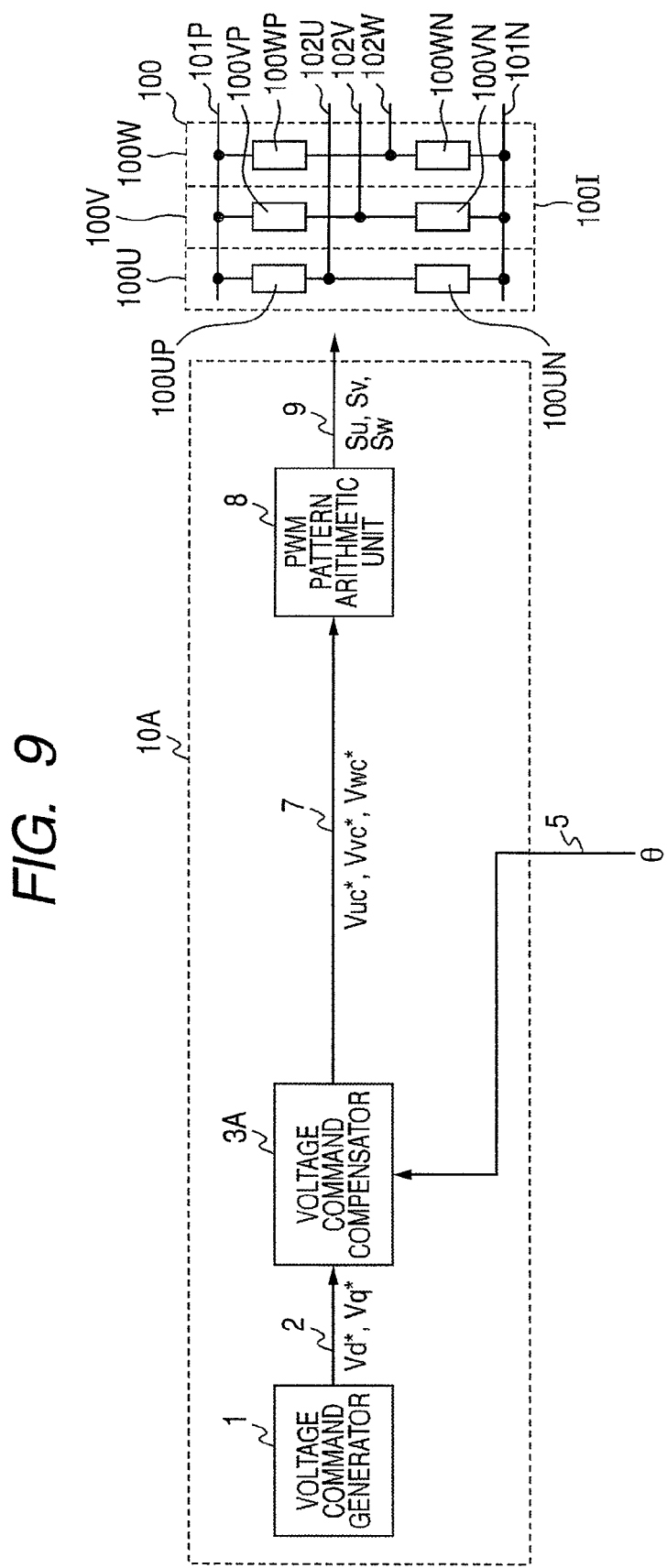
FIG. 9 is a block diagram showing an embodiment 2 of a control device for a power converter in accordance with the invention.
Figure 10:
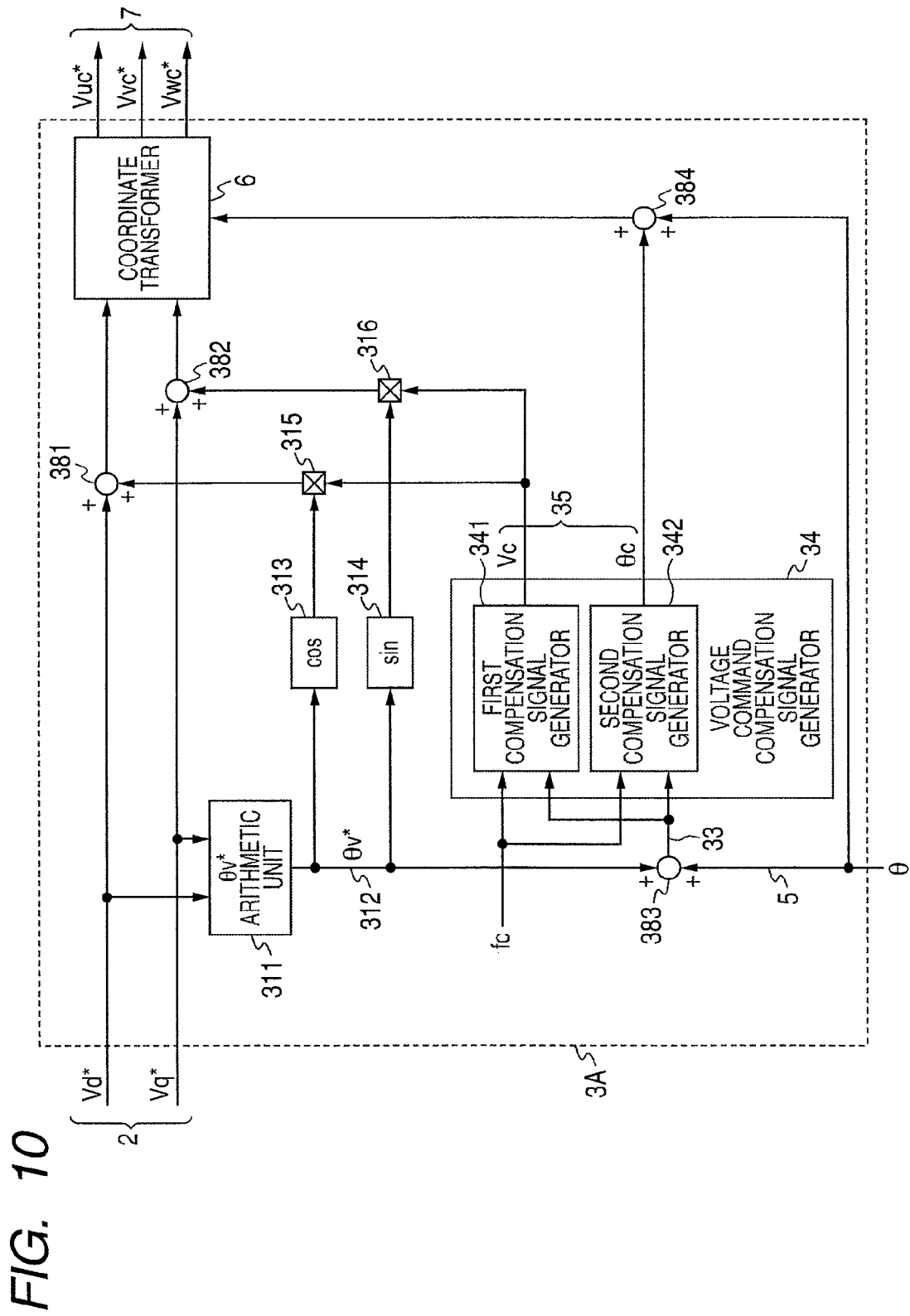
FIG. 10 is a block diagram showing the detail of a voltage command compensator in accordance with the embodiment 2.

FIG. 9 is a block diagram showing an embodiment 2 of a control device for a power converter in accordance with the invention, and FIG. 10 is a block diagram showing the detail of a voltage command compensator 3A in the embodiment 2.

In the embodiment 2, the control circuit 10 in the embodiment 1 is replaced with a control circuit 10A. In the control circuit 10A, a voltage command compensator 3A is substituted for the voltage command compensator 3 of the embodiment 1. The voltage command compensator 3A is constructed to have the coordinate transformer 6 in the control circuit 10 of the embodiment 1 incorporated therein. The voltage command compensator 3A includes, as shown in FIG. 10, a voltage command compensation signal generator 34, a θv* arithmetic unit 311, a cos arithmetic unit 313, a sin arithmetic unit 314, multipliers 315 and 316, adders 381, 382, 383, and 384, and a coordinate converter 6. The voltage command compensation signal generator 34 in the voltage command compensator 3A shown in FIG. 10 is constructed to be identical to the voltage command compensation signal generator 34 in the embodiment 1. Aside from the voltage command compensator 3A, the control circuit 10A is constructed to be identical to the control circuit 10 of the embodiment 1.

The θv* arithmetic unit 311 of the voltage command compensator 3A receives a voltage command signal Vd* on the d axis and a voltage command signal Vq* on the q axis which are included in a voltage command signal 2 on the d and q axes, and generates a phase command signal 312 of a vectorial representation. The phase command signal 312 is a phase command signal θv* of a vectorial representation. The phase command signal θv* is fed to the cos arithmetic unit 313 and sin arithmetic unit 314 and is, similarly to the embodiment 1, fed to the adder 383. The voltage command compensation signal generator 34 outputs, similarly to that of the embodiment 1, a voltage command compensation signal 35 on the basis of a voltage command phase signal 33 sent from the adder 383 and a carrier frequency fc. The voltage command compensation signal 35 includes a compensation signal Vc of an amplitude component and a compensation signal θc of a phase command. The voltage command compensation signal 35 is a compensation signal for use in suppressing a beat contained in an ac output voltage of the PWM inverter 100I.

The compensation signal Vc of an amplitude component included in the voltage command compensation signal 35 is fed to the multipliers 315 and 316. The cos arithmetic unit 313 receives the phase command signal θv*, and feeds cos θv* to the multiplier 315. The sin arithmetic unit 314 receives the phase command signal θv*, and feeds sin θv* to the multiplier 316. The multiplier 315 multiplies the compensation signal Vc of an amplitude component by cos θv*, and feeds the multiplicative output, that is, Vc×cos θv* to the adder 381. The multiplier 316 multiplies the compensation signal Vc of an amplitude component by sin θv*, and feeds the multiplicative output, that is, Vc×sin θv* to the adder 382. The adder 381 feeds the additive output of the voltage command signal Vd* on the d axis and Vc×cos θv* to the coordinate transformer 6. The adder 382 feeds the additive output of the voltage command signal Vq* on the q axis and Vc×sin θv* to the coordinate transformer 6. The adder 384 feeds the additive output of the compensation signal θc of a phase component and the coordinate transformation phase signal θ to the coordinate transformer 6.

The coordinate transformer 6 receives the additive outputs of the adders 381, 382, and 384, and generates a compensatory voltage command signal 7 on the rest frame. The compensatory voltage command signal 7 on the rest frame includes, similarly to that of the embodiment 1, compensatory voltage command signals Vuc*, Vvc*, and Vwc* for the transformation circuits 100U, 100V, and 100W of phases U, V, and W.

The embodiment 2 can provide the same advantage as the embodiment 1 does. The simpler control circuit 10A can be constructed by excluding the signal converters 31 and 37 of the embodiment 1.

Embodiment 3

Figure 11:
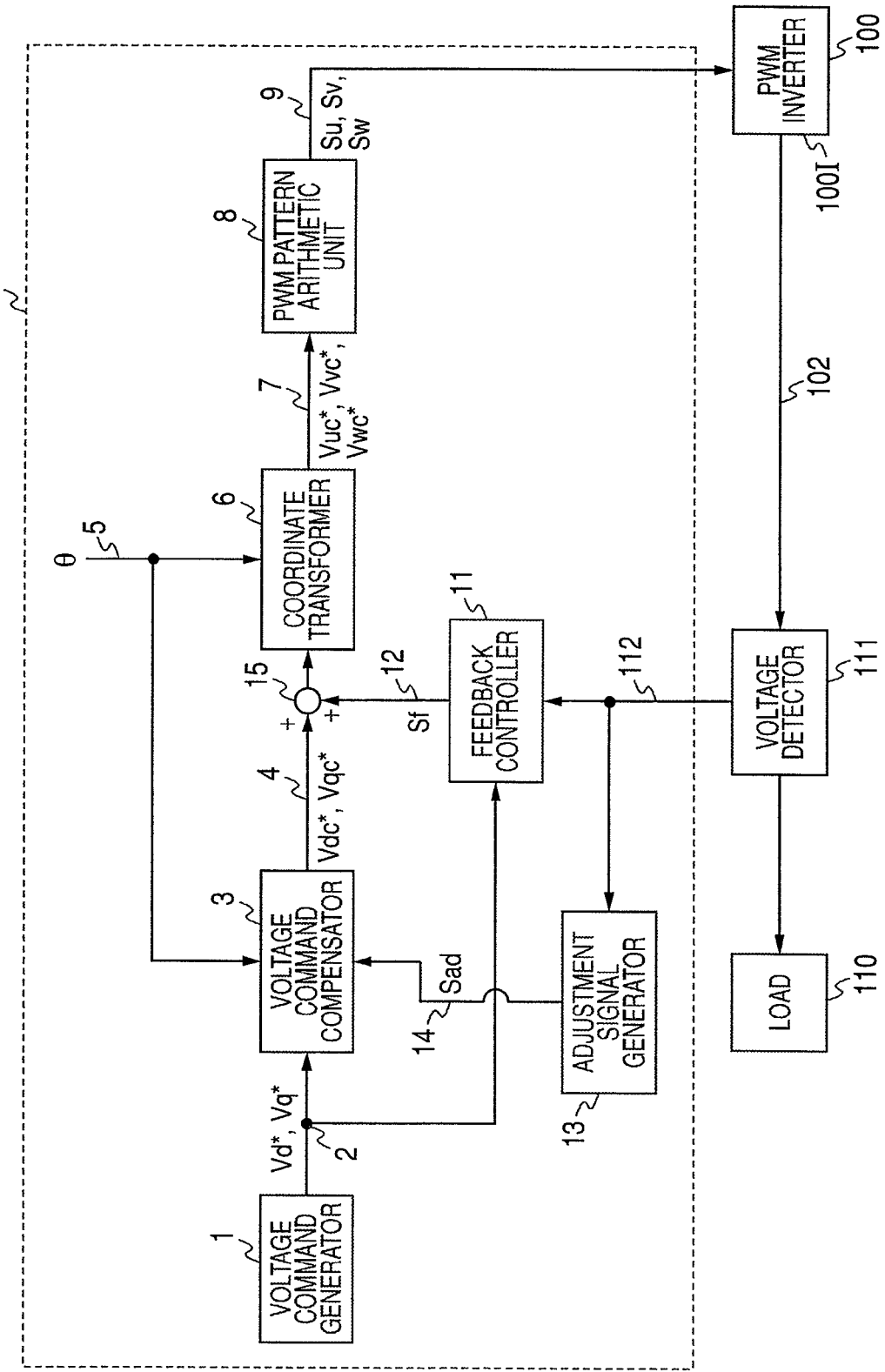
FIG. 11 is a block diagram showing an embodiment 3 of a control device for a power converter in accordance with the invention.

FIG. 11 is a block diagram showing an embodiment 3 of a control device for a power converter in accordance with the invention.

In the embodiment 3, the control circuit 10 in the embodiment 1 is replaced with a control circuit 10B. The power converter 100 is, even in the embodiment 3, constructed as a PWM inverter 100I. The PWM inverter 100I is connected to an ac load 110 over an ac line 102. The ac line 102 includes ac lines 102U, 102V, and 102W. On the ac line 102, a voltage detector 111 is disposed. The voltage detector 111 generates a conversional voltage of the PWM inverter 100I, that is, a voltage detection signal 112 corresponding to an ac output voltage.

The control circuit 10B includes a voltage command generator 1, a voltage command compensator 3, a coordinate transformer 6, a PWM pattern arithmetic unit 8, a voltage feedback controller 11, an adjustment signal generator 13, and an adder 15. The voltage command generator 1, voltage command compensator 3, coordinate transformer 6, and PWM pattern arithmetic unit 8 are constructed to be identical to those of the embodiment 1. The voltage feedback controller 11 receives the voltage detection signal 112 from the voltage detector 111, and generates a feedback signal 12 on the basis of the voltage detection signal 112. The feedback signal 12 shall be Sf.

The adder 15 is connected between the voltage command compensator 3 and coordinate transformer 6. To the adder 15, a compensatory voltage command signal 4 is fed from the voltage command compensator 3, and the feedback signal 12 is fed from the voltage feedback controller 11. The compensatory voltage command signal 4 includes a compensatory voltage command signal Vdc* on the d axis and a compensatory voltage command signal Vqc* on the q axis. The adder 15 adds the feedback signal Sf to each of the compensatory voltage command signals Vdc* and Vqc*, and corrects the compensatory voltage command signal 4 so as to further suppress a beat contained in the ac output voltage of the PWM inverter 100I.

The adjustment signal generator 13 receives the voltage detection signal 112 from the voltage detector 111, and generates the adjustment signal 14 on the basis of the voltage detection signal 112. The adjustment signal 14 shall be Sad. Since an ac output voltage on the ac line 102 contains a beat component, the adjustment signal Sad extracts the amplitude and phase of the contained beat component on the basis of the voltage detection signal 112. Since the beat component is an ac component, the adjustment signal generator 13 uses a filter to extract the beat component. The adjustment signal generator 13 is provided with a Fourier transformer. The Fourier transformer may be used to extract the beat component. The adjustment signal Sad is fed to the voltage command compensation signal generator 34. Specifically, the adjustment signal Sad is fed to the compensation tables TAB of the first and second compensation signal generators 341 and 342 shown in FIG. 5, or the arithmetic units ARS of the first and second compensation signal generators 341 and 342 shown in FIG. 6. The adjustment signal Sad fed to the compensation tables TAB shown in FIG. 5 is used to prepare multiple compensation values stored in each of the compensation tables TAB. Moreover, the adjustment signal Sad fed to the arithmetic units ARS in FIG. 6 is used to prepare the parameters Rvn, Fvn, Avn, Rthn, Fthn, and Athn in each of the parameter tables of the respective arithmetic units ARS.

As mentioned above, the embodiment 3 uses the voltage feedback controller 11 and adjustment signal generator 13 in combination with the voltage command compensator 3 in the embodiment 1. Since the voltage feedback controller 11 corrects the compensatory voltage command signal 4 so as to suppress a beat contained in the detective voltage signal 112, the beat can be further suppressed. The adjustment signal generator 13 makes it possible to automatically obtain the parameters in the compensation tables TAB or the parameter tables of the respective arithmetic units ARS according to the beat component contained in the detection signal, and makes it easy to produce the compensation tables TAB or the parameter tables of the respective arithmetic units ARS. When the compensation tables TAB or the parameter tables of the respective arithmetic units ARS are produced in advance, the tables can be finely adjusted by the adjustment signal generator 13.

In the embodiment 3, the voltage feedback controller 11, adjustment signal generator 13, and adder 15 are added to the voltage command compensator 3 of the embodiment 1. Alternatively, they may be added to the voltage command compensator 3A of the embodiment 2. In this case, the feedback signal 12 is added by the adders 381 and 382 in FIG. 10. Otherwise, the adder 15 is disposed on the output side of the coordinate transformer 6, and the voltage command signal 7 on the rest frame is corrected with the feedback signal Sf.

In the embodiment 3 shown in FIG. 11, the voltage detection signal 112 is inputted to the voltage feedback controller 11 as it is. Alternatively, after the voltage detection signal 112 is subjected to coordinate transformation and transformed into a signal on the d and q axes, the resultant signal may be inputted to the voltage feedback controller 11. In the embodiment 3 shown in FIG. 11, the voltage detection signal 112 is inputted to the adjustment signal generator 13 as it is. Alternatively, after the voltage detection signal 112 is subjected to coordinate transformation and transformed into a signal on the d and q axes, the resultant signal may be inputted to the adjustment signal generator 13. In these variants, a form convenient for processing may be selected. Moreover, in the embodiment 3 shown in FIG. 11, both the voltage feedback controller 11 and adjustment signal generator 13 are used. Alternatively, either of them, for example, the adjustment signal generator 13 alone may be used.

Embodiment 4

Figure 12:
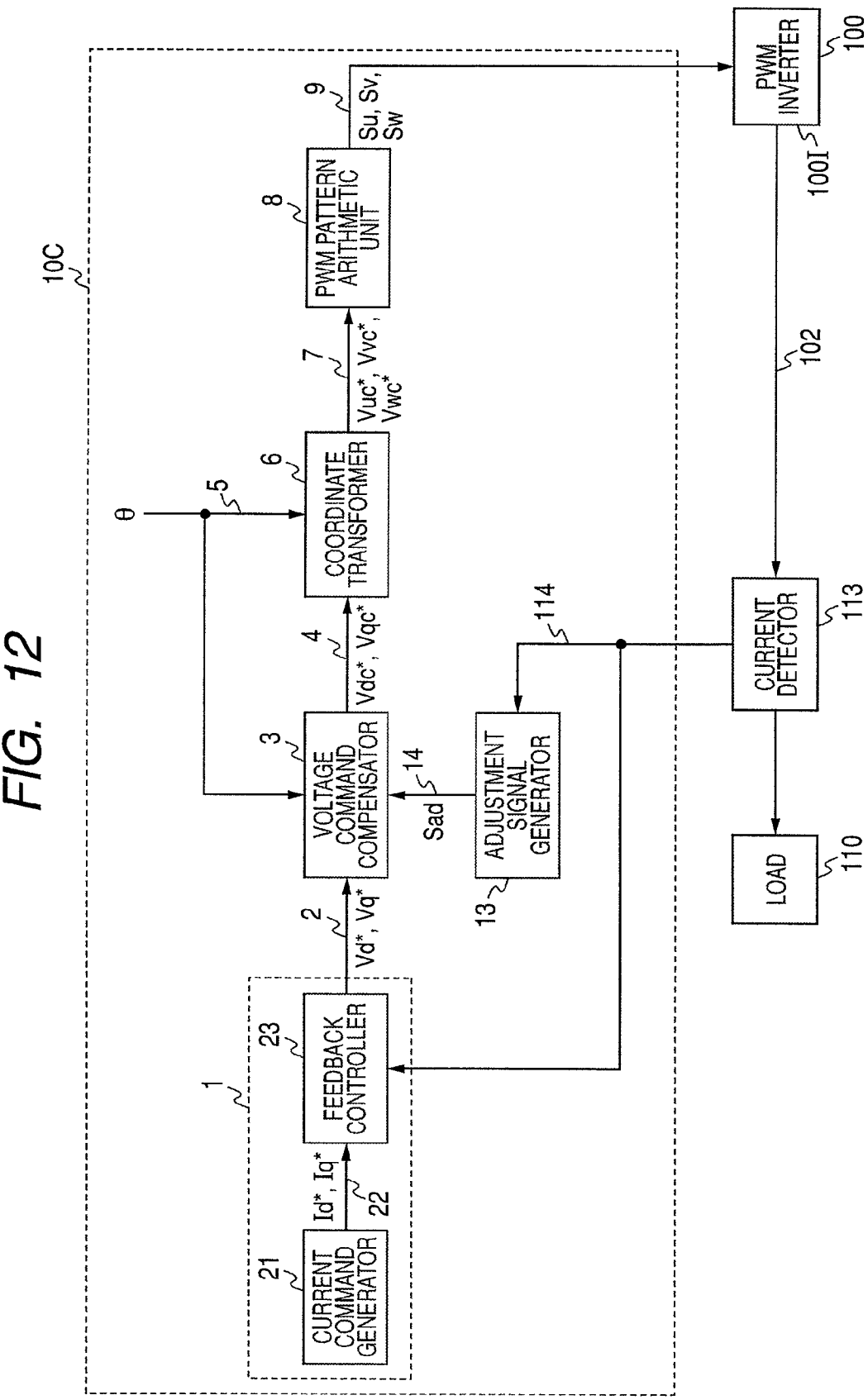
FIG. 12 is a block diagram showing an embodiment 4 of a control device for a power converter in accordance with the invention.

FIG. 12 is a block diagram showing an embodiment 4 of a control device for a power converter in accordance with the invention.

In the embodiment 4, the control circuit 10 of the embodiment 1 is replaced with a control circuit 10C. A power converter 100 is, even in the embodiment 4, constructed as a PWM inverter 100I. The PWM inverter 100I is connected to an ac load 110 over an ac line 102. The ac line 102 includes ac lines 102U, 102V, and 102W. On the ac line 102, a current detector 113 is disposed. The current detector 113 generates a conversional current of the PWM inverter 100I, that is, a current detection signal 114 corresponding to an ac output current. A beat contained in the ac output voltage of the PWM inverter 100I causes the ac output current for the ac load 110 to pulsate. The current detection signal 114 contains a pulsating component caused by the beat.

The control circuit 10C includes a current command generator 21, a current feedback controller 23, a voltage command compensator 3, a coordinate transformer 6, a PWM pattern arithmetic unit 8, and an adjustment signal generator 13. The voltage command compensator 3, coordinate transformer 6, and PWM pattern arithmetic unit 8 are constructed to be identical to those of the embodiment 1. The current command generator 21 and current feedback controller 23 constitute a voltage command generator 1. The current command generator 21 generates a current command signal 22 on the d and q axes. The current command signal 22 includes a current command signal Id* on the d axis and a current command signal Iq* on the q axis, and is fed to the current feedback controller 23. The current feedback controller 23 receives the current detection signal 114 from the current detector 113, performs feedback control on the current command signals Id* and Iq* on the basis of the current detection signal 114, and generates a voltage command signal 2. The voltage command signal 2 includes, similarly to that of the embodiment 1, a voltage command signal Vd* on the d axis and a voltage command signal Vq* on the q axis, and is fed to the voltage command compensator 3. Since the current feedback controller 23 copes with the current detection signal 114 containing a pulsating component caused by a beat, the current feedback controller 23 generates the voltage command signal 2 so as to suppress the beat.

The adjustment signal generator 13 receives the current detection signal 114 from the current detector 113, and generates the adjustment signal 14 on the basis of the current detection signal 114. The adjustment signal 14 shall be Sad. Since the pulsating component (ac component) derived from a beat is contained in the ac output current on the ac line 102, the adjustment signal Sad extracts the amplitude and phase of the contained pulsating component on the basis of the current detection signal 112. Since the pulsating component is the ac component derived from the beat, the adjustment signal generator 13 uses a filter to extract the pulsating component. The adjustment signal generator 13 may be provided with a Fourier transformer, and the Fourier transformer may be used to extract the pulsating component. The adjustment signal Sad is fed to the voltage command compensation signal generator 34. Specifically, the adjustment signal Sad is fed to the compensation tables TAB of the first and second compensation signal generators 341 and 342 shown in FIG. 5, or the arithmetic units ARS of the first and second compensation signal generators 341 and 342 shown in FIG. 6. The adjustment signal Sad fed to the compensation tables TAB shown in FIG. 5 is used to prepare multiple compensation values stored in each of the compensation tables TAB. Moreover, the adjustment signal Sad fed to the arithmetic units ARS shown in FIG. 6 is used to prepare the parameters Rvn, Fvn, Avn, Rthn, Fthn, and Athn in each of the parameter tables of the arithmetic units ARS.

As mentioned above, the embodiment 4 uses the current feedback controller 23 and adjustment signal generator 13 in combination with the voltage command compensator 3 in the embodiment 1. Since the current feedback controller 11 generates the voltage command signal 2 so as to suppress the pulsating component derived from a beat and contained in the current detection signal 114, the beat can be further suppressed. The adjustment signal generator 13 makes it possible to automatically obtain the parameters in each of the compensation tables TAB or each of the parameter tables of the respective arithmetic units ARS according to the pulsating component derived from the beat and contained in the current detection signal 114, and makes it easy to produce the compensation tables TAB or the parameter tables of the respective arithmetic units ARS. When the compensation tables TAB or the parameter tables of the arithmetic units ARS are produced in advance, they can be finely adjusted by the adjustment signal generator 13.

In the embodiment 4, in the voltage command compensator 3 of the embodiment 1, the current command generator 21 and current feedback controller 23 constitute the voltage command generator 1, and the adjustment signal generator 13 for the voltage command compensator 3 is added. These components may be adopted for the control circuit 10A of the embodiment 2. In this case, even in the control circuit 10A of the embodiment 2, the voltage command generator 1 includes the current command generator 21 and current feedback controller 23, and the adjustment signal generator 13 for the voltage command compensator 3A is added.

In the embodiment 4 shown in FIG. 12, the current detection signal 114 is inputted to the current feedback controller 23 as it is. After the current detection signal 114 is subjected to coordinate transformation and transformed into a signal on the d and q axes, the resultant signal may be inputted to the current feedback controller 23. In the embodiment 4 shown in FIG. 12, the current detection signal 114 is inputted to the adjustment signal generator 13 as it is. After the current detection signal 114 is subjected to coordinate transformation and transformed into a signal on the d and q axes, the resultant signal may be inputted to the adjustment signal generator 13. In these variants, a form convenience for processing may be selected. In the embodiment 4 shown in FIG. 12, both the current feedback controller 23 and the adjustment signal generator 13 are used. Either of them, for example, the adjustment signal generator 13 alone may be used.

Embodiment 5

Figure 13:
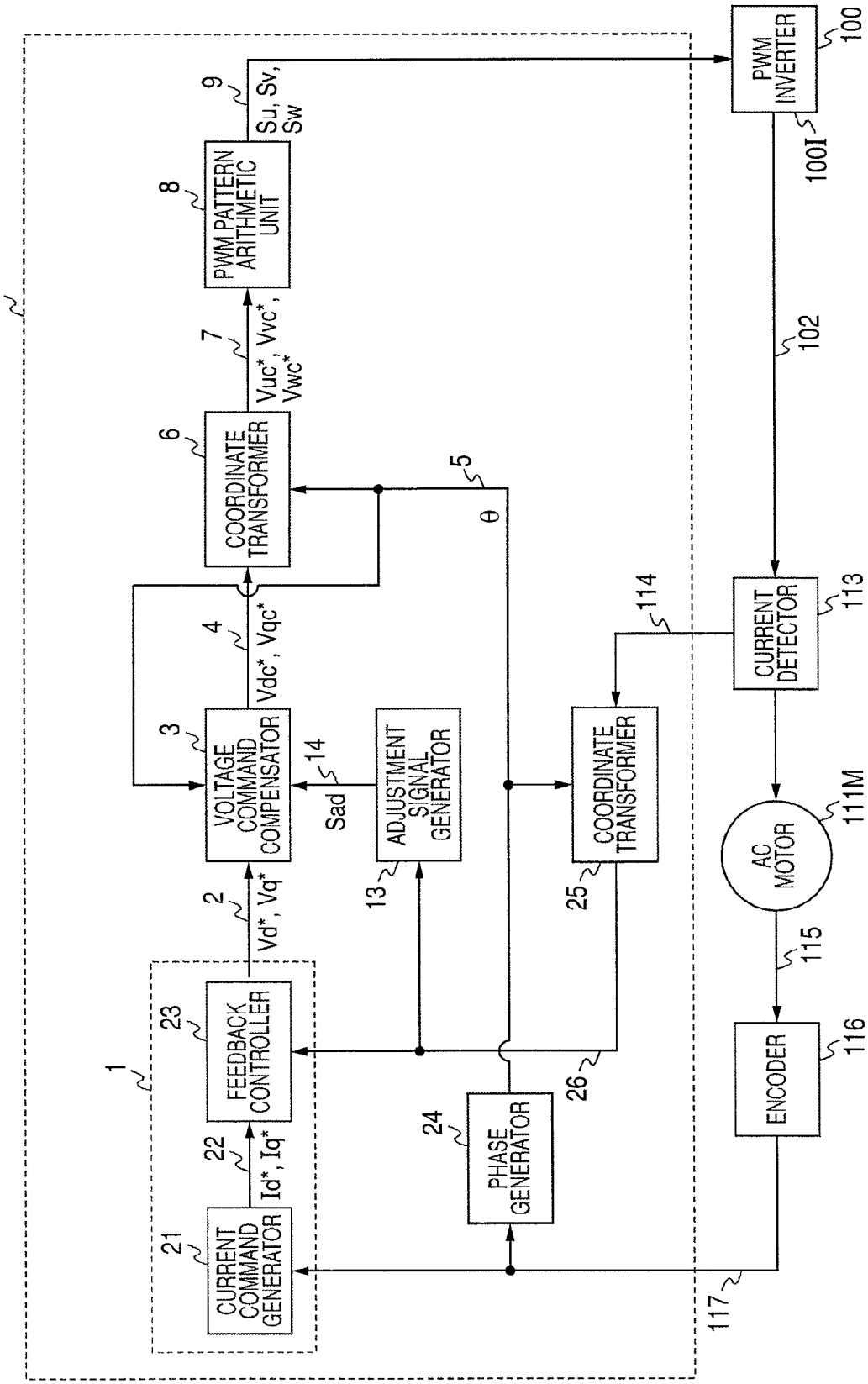
FIG. 13 is a block diagram showing an embodiment 5 of a control device for a power converter in accordance with the invention.

FIG. 13 is a block diagram showing an embodiment 5 of a control device for a power converter in accordance with the invention. The embodiment 5 includes a power converter 100 constructed as a PWM inverter 100I, and has the PWM inverter 100I applied to a driving system for an ac motor 111M.

In the embodiment 5, as shown in FIG. 13, the PWM inverter 100I is connected to the ac motor 111M over an ac line 102, and the PWM inverter 100I drives the ac motor 111M. A current detector 113 is connected on the ac line 102, and the current detector 113 outputs a current detection signal 114 corresponding to an ac driving current that flows from the PWM inverter 100I to the ac motor 111M. The ac motor 111M is provided with an encoder 116. The encoder 116 receives the rotation 115 of the shaft of the ac motor 111M, and outputs an encoder signal 117. The encoder signal is a signal containing speed information and position information on the ac motor 111M. As the ac motor 111M, various ac motors including an induction motor and a synchronous motor can be adopted.

In the embodiment 5, a control circuit 10D is substituted for the control circuit 10 of the embodiment 1. The control circuit 10D includes a current command generator 21, a current feedback controller 23, a voltage command compensator 3, a coordinate transformer 6, a PWM pattern arithmetic unit 8, an adjustment signal generator 13, a phase generator 24, and a coordinate transformer 25. The voltage command compensator 3, coordinate transformer 6, and PWM pattern arithmetic unit 8 are constructed to be identical to those of the embodiment 1.

The current command generator 21 receives an encoder signal 117 from an encoder 116, and generates a current command signal 22 on the d and q axes on the basis of the encoder signal 117. The current command signal 22 includes a current command signal Id* on the d axis and a current command signal Iq* on the q axis, and is fed to the current feedback controller 23. The phase generator 24 receives the encoder signal 117 from the encoder 116, and generates a coordinate transformation signal 5, or more particularly, a coordinate transformation phase signal θ. The coordinate transformation phase signal θ is fed to each of the voltage command compensator 3 and coordinate transformer 6, and is also fed to the coordinate transformer 25. The coordinate transformer 25 receives the current detection signal 114 from the current detector 113, and transforms the current detection signal 114 into a current detection signal 26 on the d and q axes on the basis of the coordinate transformation phase signal θ.

The current command generator 21 and current feedback controller 23 constitute a voltage command generator 1. The current feedback controller 23 receives the current detection signal 26 on the d and q axes from the coordinate transformer 25, performs feedback control on the current command signals Id* and Iq* on the basis of the current detection signal 26, and generates a voltage command signal 2. The voltage command signal 2 includes, similarly to that of the embodiment 1, a voltage command signal Vd* on the d axis and a voltage command signal Vq* on the q axis, and is fed to the voltage command compensator 3. Since the current feedback controller 23 copes with the current detection signal 114 containing a pulsating component caused by a beat, the current feedback controller 23 generates the voltage command signal 2 so as to suppress the beat.

In the embodiment 5, the adjustment signal generator 13 receives the current detection signal 26 on the d and q axes from the coordinate transformer 25, generates an adjustment signal Sad, and feeds the adjustment signal Sad to the voltage command compensation voltage generator 34 of the voltage command compensator 3. Since an ac driving current on the ac line 102 contains a pulsating component derived from a beat, the adjustment signal Sad extracts the amplitude and phase of the contained pulsating component derived from the beat on the basis of the current detection signal 26. Since the pulsating component is an ac component, the adjustment signal generator 13 uses, similarly to the adjustment signal generator 13 of the embodiment 4, a filter or a Fourier transformer to extract the pulsating component. The adjustment signal Sad is, similarly to that of the embodiment 4, fed to the compensation tables TAB of the first and second compensation signal generators 341 and 342 shown in FIG. 5 or the arithmetic units ARS of the first and second compensation signal generators 341 and 342 shown in FIG. 6. The adjustment signal Sad fed to the compensation tables TAB in FIG. 5 is used to prepare multiple compensation values stored in each of the compensation tables TAB. Moreover, the adjustment signal Sad fed to the arithmetic units ARS in FIG. 6 is used to prepare the parameters Rvn, Fvn, Avn, Rthn, Fthn, and Athn in each of the parameter tables of the respective arithmetic units ARS.

In the embodiment 5 having the control circuit 10D applied to the driving system for the ac motor 111M, the beat of the PWM inverter 100I can be suppressed in the asynchronous pulse-width control method in which a carrier frequency fc cannot be made sufficiently large compared with the fundamental frequency f of the PWM inverter 100I, and the driving current for the ac motor 111M can be prevented from pulsating along with the beat. If the driving current for the ac motor 111M pulsates, a ripple occurs in the torque of the ac motor 111M. Moreover, noise increases. In the embodiment 5, the ripple in the torque and the increase in noise can be suppressed. Moreover, if the driving current pulsates, an unnecessary current increases and a power loss grows. In the embodiment 5, the power loss of the ac motor 111M can be reduced. Moreover, even if the fundamental frequency f of the PWM inverter 100I grows to approach a carrier frequency fc, since the beat can be suppressed, the operating speed domain for the ac motor 111M can be expanded to a range in which the fundamental frequency f of the PWM inverter 100I is high. Conversely, the carrier frequency fc can be approached to the fundamental frequency f of the PWM inverter 100I, and a switching loss in the PWM inverter 100I can be minimized.

In the embodiment 5, in the voltage command compensator 3 of the embodiment 1, the current command generator 21 and current feedback controller 23 constitute the voltage command generator 1, and the adjustment signal generator 13 for the voltage command compensator 3 is added. The phase generator 24 and coordinate transformer 25 are additionally included. These components may be adapted for the control circuit 10A of the embodiment 2. In this case, even in the control circuit 10A of the embodiment 2, the voltage command generator 1 includes the current command generator 21 and current feedback controller 23. The adjustment signal generator 13 for the voltage command compensator 3A is added, and the phase generator 24 and coordinate transformer 25 are additionally included.

Embodiment 6

Figure 14:
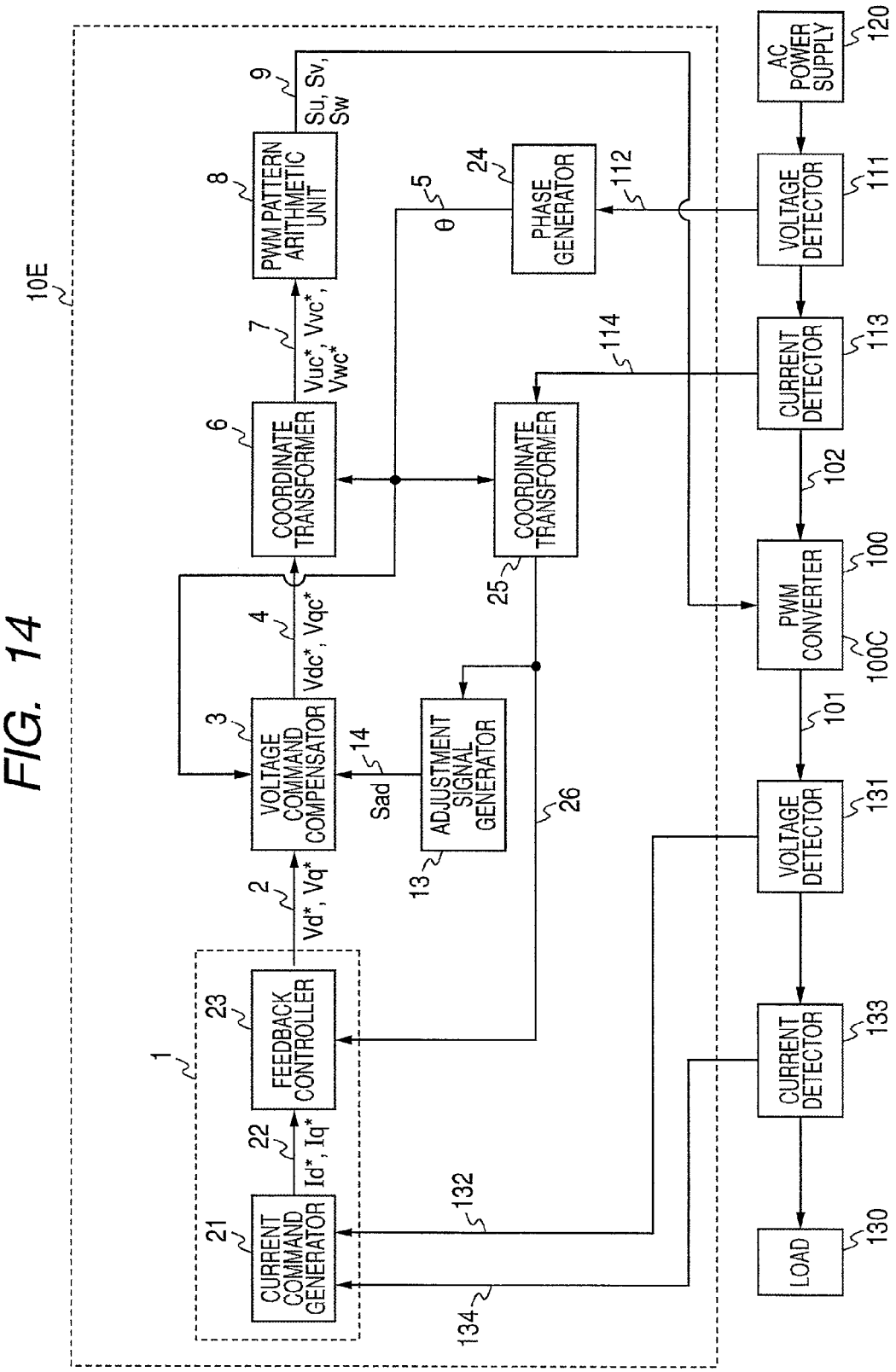
FIG. 14 is a block diagram showing an embodiment 6 of a control device for a power converter in accordance with the invention.

FIG. 14 is a block diagram showing an embodiment 6 of a control device for a power converter in accordance with the invention. The embodiment 6 has a power converter 100 constructed as a PWM converter 100C, and has the PWM converter 100C applied to a converter system in which the PWM converter 100C is driven from an ac power supply 120 in order to supply power to a dc load 130.

In the embodiment 6, as shown in FIG. 14, the PWM converter 100C is connected to the ac power supply 120 over an ac line 102, and connected to the dc load 130 over a dc line 101. The ac power supply 120 is a mains ac power supply and the frequency thereof is 50 Hz or 60 Hz. The PWM converter 100C is driven by the ac power supply 120, and converts an ac voltage from the ac power supply 120 into a dc voltage. The conversional voltage of the PWM converter 100C is an ac voltage of the ac power supply 120, and the fundamental frequency f thereof is 50 Hz or 60 Hz. A conversional current of the PWM converter 100C is an ac current that flows from the ac power supply 120 to the PWM converter 100C.

The ac line 102 includes ac lines 102U, 102V, and 102W, and a voltage detector 111 and a current detector 113 are connected onto the ac line 102. The voltage detector 111 outputs a voltage detection signal 112 corresponding to the conversional voltage of the PWM converter 100C. The current detector 113 outputs a current detection signal 114 corresponding to the conversional current that flows into the PWM converter 100C. The dc line 101 includes dc lines 101P and 101N. The voltage detector 131 and current detector 133 are connected onto the dc line 101. The voltage detector 131 outputs a voltage detection signal 132 corresponding to the dc voltage on the dc line 101. The current detector 133 outputs a current detection signal 134 corresponding to a dc current flowing through the dc line 101.

In the embodiment 6, a control circuit 10E is substituted for the control circuit 10 of the embodiment 1. The control circuit 10E includes a current command generator 21, a current feedback controller 23, a voltage command compensator 3, a coordinate transformer 6, a PWM pattern arithmetic unit 8, an adjustment signal generator 13, a phase generator 24, and a coordinate transformer 25. The voltage command compensator 3, coordinate transformer 6, and PWM pattern arithmetic unit 8 are constructed to be identical to those of the embodiment 1.

The current command generator 21 and current feedback controller 23 constitute a voltage command generator 1. The current command generator 21 receives a voltage detection signal 132 from the voltage detector 131, receives a current detection signal 134 from the current detector 133, and generates a current command signal 22 on the d and q axes on the basis of the voltage detection signal 132 and current detection signal 134. The current command signal 22 includes a current command signal Id* on the d axis and a current command signal Iq* on the q axis, and is fed to the current feedback controller 23. The phase generator 24 receives a voltage detection signal 112 from the voltage detector 111, and generates a coordinate transformation signal 5, or more particularly, a coordinate transformation phase signal θ. The coordinate transformation phase signal θ is fed to the voltage command compensator 3 and coordinate transformer 6, and is also fed to the coordinate transformer 25. The coordinate transformer 25 receives a current detection signal 114 from the current detector 113, and transforms the current detection signal 114 into a current detection signal 26 on the d and q axes on the basis of the coordinate transformation phase signal θ.

The current feedback controller 23 receives the current detection signal 26 on the d and q axes from the coordinate transformer 25, performs feedback control on the current command signals Id* and Iq* on the basis of the current detection signal 26, and generates a voltage command signal 2. The voltage command signal 2 includes, similarly to that of the embodiment 1, a voltage command signal Vd* on the d axis and a voltage command signal Vq* on the q axis, and is fed to the voltage command compensator 3. Since the current feedback controller 23 copes with a current detection signal 114 containing a pulsating component caused by a beat, the current feedback controller 23 generates the voltage command signal 2 so as to suppress the pulsating component caused by the beat.

The adjustment signal generator 13 receives, in the embodiment 6, the current detection signal 26 on the d and q axes from the coordinate transformer 25, generates an adjustment signal Sad, and feeds the adjustment signal Sad to the voltage command compensation voltage generator 34 of the voltage command compensator 3. Since the pulsating component derived from a beat is contained in the ac current on the ac line 102, the adjustment signal Sad extracts the amplitude and phase of the contained pulsating component on the basis of the current detection signal 26. Since the pulsating component is an ac component, the adjustment signal generator 13 uses, similarly to the adjustment signal generator 13 of the embodiment 4, a filter or a Fourier transformer to extract the pulsating component. The adjustment signal Sad is, similarly to that of the embodiment 4, fed to the compensation tables TAB of the first and second compensation signal generators 341 and 342 shown in FIG. 5 or the arithmetic units ARS of the first and second compensation signal generators 341 and 342 shown in FIG. 6. The adjustment signal Sad fed to the compensation tables TAB in FIG. 5 is used to prepare multiple compensation values stored in each of the compensation tables TAB. Moreover, the adjustment signal Sad fed to the arithmetic units ARS in FIG. 6 is used to prepare the parameters Rvn, Fvn, Avn, Rthn, Fthn, and Athn in each of the parameter tables of the arithmetic units ARS.

In the embodiment 6 having the control circuit 10E applied to the PWM converter system, a switching loss in the PWM converter 100C can be minimized by lowering a carrier frequency. Moreover, even when the carrier frequency fc is lowered, since occurrence of a beat is suppressed, it is possible to achieve high-power factor control with occurrence of a harmonic current prevented. In the embodiment 6, the ac power supply 120 is a mains power supply. Alternatively, the ac power supply 120 may be a dynamo-electric generator. Needless to say, a switching loss can be minimized by lowering a carrier frequency according to the fundamental frequency of the generator.

In the embodiment 6, in the voltage command compensator 3 of the embodiment 1, the current command generator 21 and current feedback controller 23 constitute the voltage command generator 1, the adjustment signal generator 13 for the voltage command compensator 3 is added, and the phase generator 24 and coordinate transformer 25 are additionally included. These components may be adopted for the control circuit 10A of the embodiment 2. In this case, even in the control circuit 10A of the embodiment 2, the voltage command generator 1 includes the current command generator 21 and current feedback controller 23, the adjustment signal generator 13 for the voltage command compensator 3A is added, and the phase generator 24 and coordinate transformer 25 are additionally included.

INDUSTRIAL APPLICABILITY

A control device for a power converter in accordance with the invention can be utilized for a control device for various types of power converters that perform power conversion between dc power and ac power.

The invention claimed is:

1. A control device for a power converter that controls the power converter, the power converter converting between direct-current power and alternating-current power using a plurality of semiconductor switching elements, the control device comprising:
    voltage command means that generates a voltage command signal;
    voltage command compensation means that compensates the voltage command signal to generate a compensatory voltage command signal; and
    switching pattern arithmetic means that generates a switching signal for each of the semiconductor switching elements based on the compensatory voltage command signal and a carrier wave, wherein if conversional fundamental frequency of the power converter is f and carrier frequency of the carrier wave is fc, the voltage command compensation means generates a compensation signal that includes at least one compensatory frequency component selected from the group of frequencies consisting of fc-n×f (where n denotes successive positive and negative integers), and generates the compensatory voltage command signal based on the compensation signal.

2. The control device for a power converter according to claim 1, wherein the voltage command compensation means generates the compensation signal including a plurality of compensatory frequency components selected from the group, and generates the compensatory voltage command signal based on the compensation signal.

3. The control device for a power converter according to claim 1, wherein the voltage command compensation means includes a compensation table in which a compensation value is stored, and uses the compensation value to generate the compensation signal.

4. The control device for a power converter according to claim 3, further comprising a voltage detector that outputs a voltage detection signal corresponding to a conversional voltage of the power converter, wherein the compensation value of the compensation table is prepared based on the voltage detection signal.

5. The control device for a power converter according to claim 3, further comprising a current detector that outputs a current detection signal corresponding to a conversional current of the power converter, wherein the compensation value of the compensation table is prepared based on the current detection signal.

6. The control device for a power converter according to claim 1, wherein the voltage command compensation means computes the compensation signal based on a phase base signal, $\theta b$, corresponding to the compensatory frequency component, and parameters R, F, and A according to an arithmetic expression $R \times \cos(\theta b + F) + A$.

7. The control device for a power converter according to claim 6, wherein the voltage command compensation means includes a parameter table in which the parameters R, F, and A are stored.

8. The control device for a power converter according to claim 7, further comprising a voltage detector that outputs a voltage detection signal corresponding to a conversional voltage of the power converter, wherein the parameters of the parameter table are prepared based on the voltage detection signal.

9. The control device for a power converter according to claim 7, further comprising a current detector that outputs a current detection signal corresponding to a conversional current of the power converter, wherein the parameters of the parameter table are prepared based on the current detection signal.

10. The control device for the power converter according to claim 1, further comprising:
    a voltage detector that outputs a voltage detection signal corresponding to a conversional voltage of the power converter, and
    voltage feedback control means that generates a feedback signal based on the voltage detection signal, wherein the compensatory voltage command signal is corrected based on the feedback signal.

11. The control device for the power converter according to claim 1, further comprising:
    a current detector that outputs a current detection signal corresponding to a conversional current of the power converter, and
    current feedback control means that generates a feedback signal based on the current detection signal, wherein the compensatory voltage command signal is corrected based on the feedback signal.

12. The control device for the power converter according to claim 1, wherein the power converter converts direct-current power into alternating-current power.

13. The control device for the power converter according to claim 1, wherein the power converter converts alternating-current power into direct-current power.

* * * * *